(12) United States Patent
Chalker

(10) Patent No.: US 10,778,413 B2
(45) Date of Patent: *Sep. 15, 2020

(54) DEVICE AND METHOD FOR RESONANT CRYPTOGRAPHY

(71) Applicant: Global Risk Advisors, New York, NY (US)

(72) Inventor: Kevin Chalker, New York, NY (US)

(73) Assignee: Global Risk Advisors, New York, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/760,568

(22) PCT Filed: Sep. 14, 2016

(86) PCT No.: PCT/US2016/051696
§ 371 (c)(1),
(2) Date: Mar. 15, 2018

(87) PCT Pub. No.: WO2017/048819
PCT Pub. Date: Mar. 23, 2017

(65) Prior Publication Data
US 2018/0254886 A1    Sep. 6, 2018

Related U.S. Application Data

(63) Continuation of application No. 14/976,839, filed on Dec. 21, 2015, now Pat. No. 9,660,803.
(Continued)

(51) Int. Cl.
*H04L 9/06* (2006.01)
*H04L 9/12* (2006.01)
(Continued)

(52) U.S. Cl.
CPC ............ *H04L 9/065* (2013.01); *H04L 9/0656* (2013.01); *H04L 9/0662* (2013.01);
(Continued)

(58) Field of Classification Search
CPC ..... H04L 9/065; H04L 9/0656; H04L 9/0662; H04L 9/12; H04L 9/16; H04L 9/0872;
(Continued)

(56) References Cited

U.S. PATENT DOCUMENTS 5,319,735 A    6/1994 Preuss et al.
5,659,726 A    8/1997 Sandford, II et al.
(Continued)

FOREIGN PATENT DOCUMENTS

JP    10-215243 A    8/1998
JP    11-224183 A    8/1999
(Continued)

OTHER PUBLICATIONS

International Search Report dated Nov. 30, 2016, issued in corresponding PCT International Application No. PCT/US2016/051696.
(Continued)

*Primary Examiner* — Darren B Schwartz
(74) *Attorney, Agent, or Firm* — Troutman Pepper Hamilton Sanders LLP

(57) ABSTRACT

A system for secure communications using resonant cryptography includes a resonator that has a random number generator (RNG). The RNG can be at least one of a true random number generator, pseudo-random number generator, and any non-repeating sequence of numbers having a characteristic of a random number stream, and generating a first stream of random numbers. A transmitter, electrically coupled to the random number generator, is also included to transmit the generated first stream of random numbers.

26 Claims, 18 Drawing Sheets

Related U.S. Application Data

(60) Provisional application No. 62/218,850, filed on Sep. 15, 2015.

(51) Int. Cl.
*H04L 9/16* (2006.01)
*H04L 9/08* (2006.01)
*G06F 7/58* (2006.01)

(52) U.S. Cl.
CPC .......... *H04L 9/0668* (2013.01); *H04L 9/0816* (2013.01); *H04L 9/0872* (2013.01); *H04L 9/12* (2013.01); *H04L 9/16* (2013.01); *G06F 7/582* (2013.01); *G06F 7/588* (2013.01); *H04L 2209/08* (2013.01)

(58) Field of Classification Search
CPC . H04L 9/0816; H04L 9/0668; H04L 2209/08; G06F 7/582; G06F 7/588
See application file for complete search history.

(56) References Cited

U.S. PATENT DOCUMENTS

| | | | |
|---|---|---|---|
| 6,021,203 A | 2/2000 | Douceur et al. | |
| 6,043,752 A | 3/2000 | Hisada et al. | |
| 6,052,786 A | 4/2000 | Tsuchida | |
| 6,266,413 B1 | 7/2001 | Shefi | |
| 6,269,164 B1 | 7/2001 | Pires | |
| 6,445,794 B1 | 9/2002 | Shefi | |
| 6,711,400 B1 | 3/2004 | Aura | |
| 6,868,495 B1 | 3/2005 | Glover | |
| 7,526,643 B2 | 4/2009 | Stedron et al. | |
| 7,814,320 B2 | 10/2010 | Mackenzie et al. | |
| 8,050,411 B2 | 11/2011 | Munro et al. | |
| 8,160,243 B1 | 4/2012 | Bean | |
| 8,213,620 B1 | 7/2012 | Sussland et al. | |
| 8,250,363 B2 | 8/2012 | Tofts et al. | |
| 8,275,997 B2 | 9/2012 | Stedron et al. | |
| 8,386,800 B2 | 2/2013 | Kocher et al. | |
| 8,401,186 B2 | 3/2013 | Liu | |
| 8,458,452 B1 | 6/2013 | Morgan | |
| 8,769,270 B2 | 7/2014 | Orsini et al. | |
| 8,842,839 B2 | 9/2014 | Harrison et al. | |
| 8,914,635 B2 | 12/2014 | Parrish | |
| 8,924,706 B2 | 12/2014 | Marlow et al. | |
| 8,948,377 B2 | 2/2015 | Shibata et al. | |
| 8,995,652 B1 | 3/2015 | Thompson | |
| 9,001,998 B2 | 4/2015 | Liu | |
| 9,084,112 B2 | 7/2015 | Halford et al. | |
| 2002/0136407 A1* | 9/2002 | Denning | G06F 21/10 380/258 |
| 2003/0016821 A1 | 1/2003 | Hammersmith | |
| 2004/0161106 A1 | 8/2004 | Matsuda | |
| 2005/0254656 A1 | 11/2005 | Rose et al. | |
| 2007/0195951 A1 | 8/2007 | Leung | |
| 2009/0060180 A1 | 3/2009 | Schneider | |
| 2009/0262942 A1 | 10/2009 | Maeda et al. | |
| 2009/0316900 A1* | 12/2009 | Qiu | H04L 9/3242 380/258 |
| 2012/0106735 A1 | 5/2012 | Fukuda | |
| 2014/0006797 A1* | 1/2014 | Cordella | G06F 12/1408 713/189 |
| 2015/0229621 A1 | 8/2015 | Kariman | |
| 2015/0365824 A1* | 12/2015 | Gustafson | H04L 9/0844 380/263 |
| 2016/0197729 A1* | 7/2016 | Jones | H04L 9/0863 713/184 |

FOREIGN PATENT DOCUMENTS

| | | |
|---|---|---|
| JP | 2003-150452 A | 5/2003 |
| JP | 2004-64333 A | 2/2004 |
| JP | 2004-80663 A | 3/2004 |
| JP | 2008-234051 A | 10/2008 |
| JP | 2009-245227 A | 10/2009 |
| JP | 2012-182825 A | 9/2012 |
| JP | 2013-258697 A | 12/2013 |
| WO | 2010/150813 A1 | 12/2010 |

OTHER PUBLICATIONS

Notice of Reasons for Refusal issued in corresponding Japanese Patent Application No. 2018-532542 dated Feb. 21, 2020, with machine translation.

\* cited by examiner

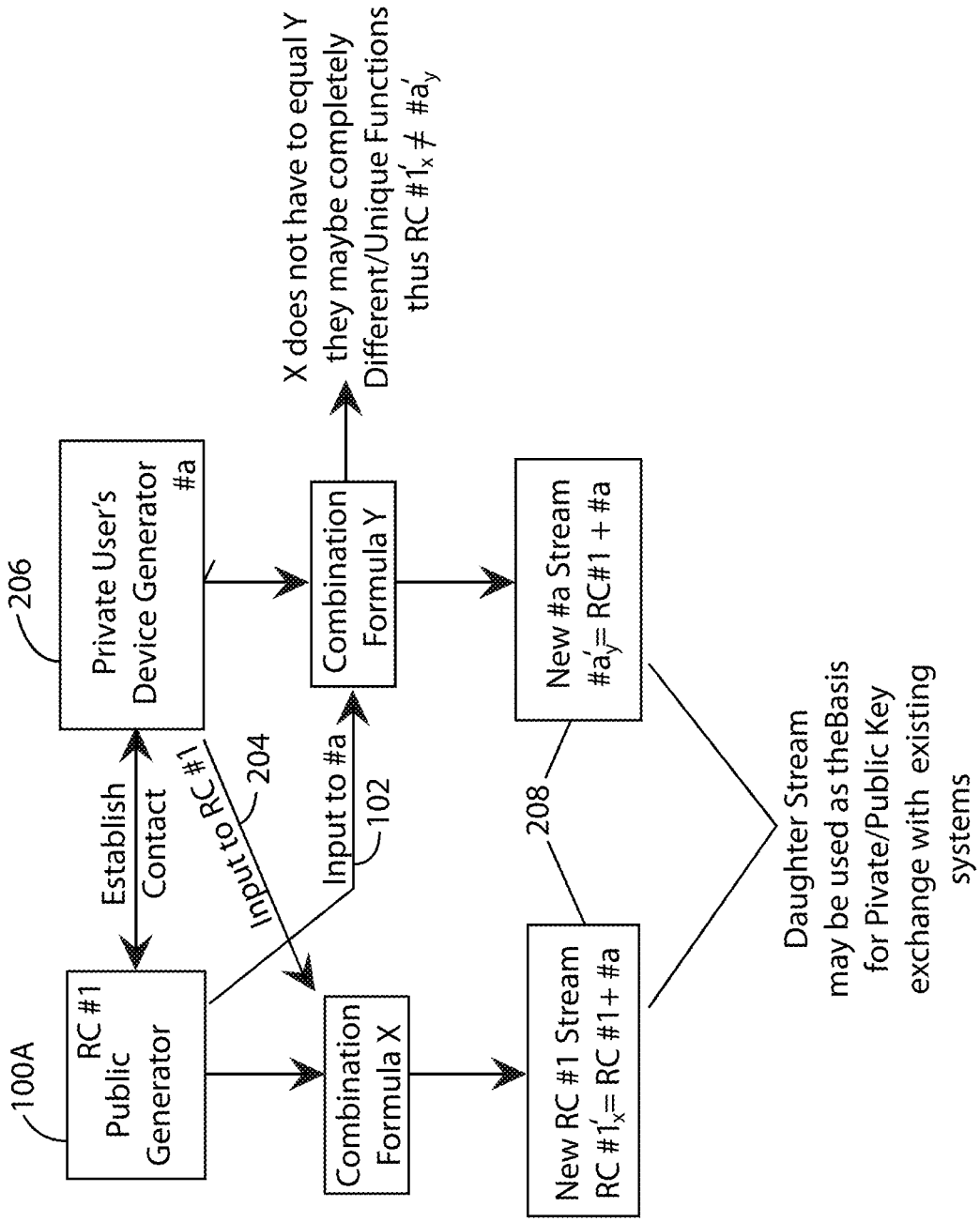

Figure 12A
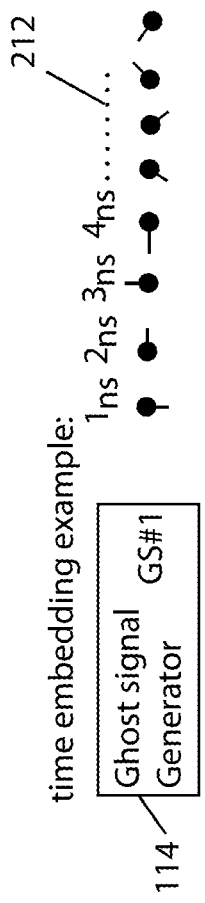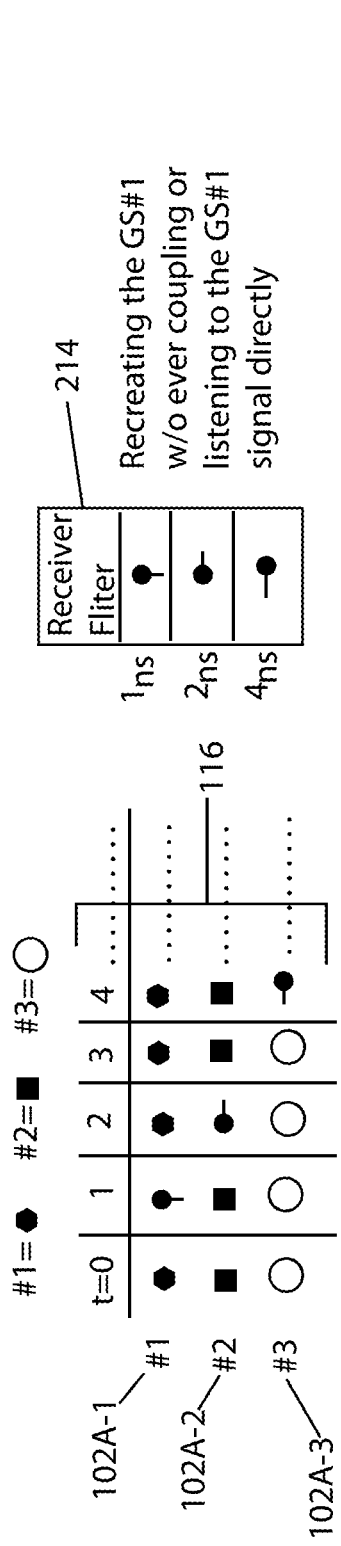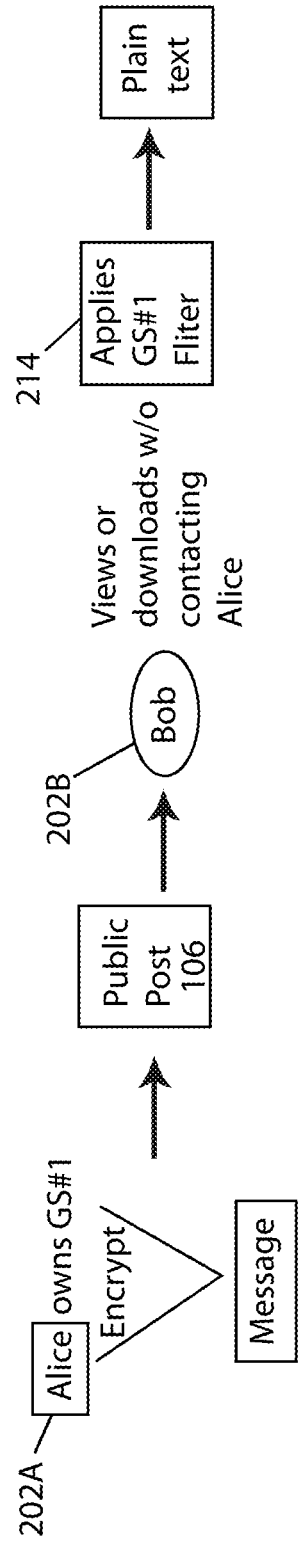

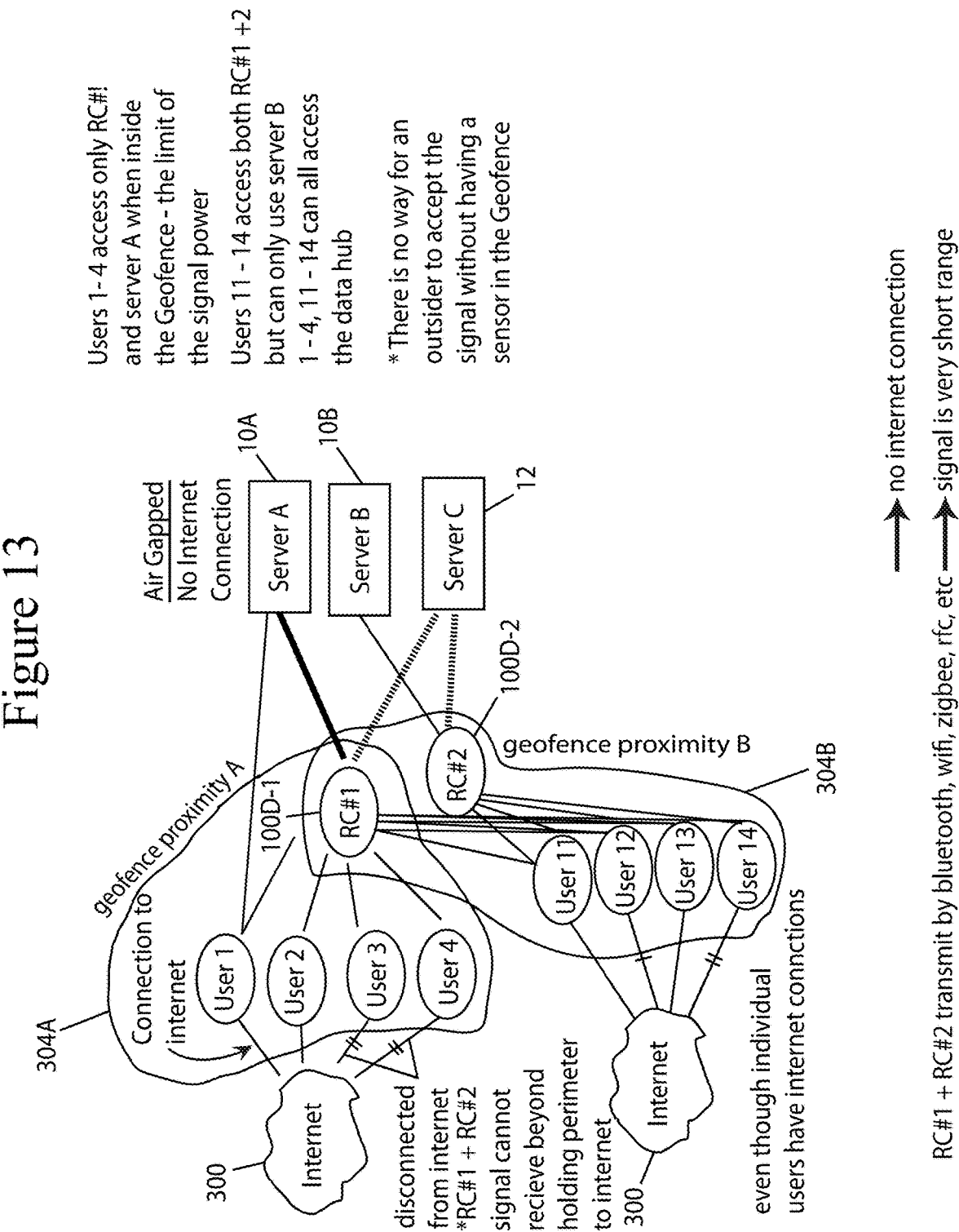

DEVICE AND METHOD FOR RESONANT CRYPTOGRAPHY

CROSS REFERENCE TO RELATED APPLICATIONS

This is a U.S. National Phase Application under 35 U.S.C. § 371 of International Patent Application No. PCT/US2016/51696, filed Sep. 14, 2016, and claims benefit of priority to U.S. application Ser. No. 14/976,839, filed Dec. 21, 2015 and U.S. Provisional Application No. 62/218,850, filed Sep. 15, 2015. The entireties of all above applications are incorporated herein by reference.

FIELD OF THE INVENTION

The technology herein relates to computer security, and more particularly to secure methods for transferring data electronically across any network. Still more particularly, the technology herein relates to data encryption techniques using one time pads concepts and small size data keys with confidence.

BACKGROUND

Public key cryptography ("PKI") was first developed in the 1970s and has witnessed only modest incremental improvements to date. The known weaknesses are well studied as are the systemic failures resulting in devastating hacks from the flawed creaky fundamentals of the design itself. The basic reason is PKI is a "perfect world" solution—it only works well in an error-free environment. It fails catastrophically in the real world.

Data encryption is known that uses streaming ciphers or block ciphers. Streaming and block ciphers are widely used even though they are not mathematically provable to be 100% secure. These can use asymmetric (or public key) cryptography. The keys are typically of a fixed size and may be static. A calculation is done, one each side, to encrypt or decrypt the data. In a typical public key scenario, a sender uses the public key of a public-key and private-key pair to encrypt a message. The receiver uses the corresponding private key to decrypt the message. Security is provided because it is generally computationally infeasible to derive the private key from the public key.

These modern ciphers are inferior, including Elliptical Curves Cryptography ("ECC"), AES, RSA, etc, because they are vulnerable to brute force attack against the key space—albeit over a long period of time using powerful computers. With the advent of quantum computers in development today, the time for decrypting these modern systems using these techniques can be vastly decreased. In August 2015, an NSA advisory confirmed the immediate future risk of using these systems and recommend against the use of ECC. Additional guidance confirmed the entire class of these cryptographic systems suffered from the same risk and could not be used as the basis for securing information.

One-time pads were invented early on in the 20th century and are the only provably secure cryptosystem which was also invulnerable to attack by quantum computers. They are normally reserved for the most secure communications requirements. One-Time Pad ("OTP") encryption using random keys can produce provable perfect secrecy. In fact, any cryptosystem with perfect secrecy must use OTP-like key structures to be resistant to cryptanalysis and brute force attack. Even quantum computers, noted above, will have zero impact on OTP-based cryptosystems.

In a manual OTP scenario, the sender has a pad of paper on which is written randomly chosen key letters. The key is the same size as the message. In one implementation, the sender adds one key letter to each plaintext letter to produce cipher text, and never repeat the key letters. For example, assume the message is "YES" and the pad letters are "CMG". You add Y (25) to C (3) to get B (26+3=2 modulo 26), or E (5) to M (13) to get R (18). The sender then destroys the paper. The receiver reverses the process using his pad of paper (the encryption is thus symmetric), and then burns the key letters when he is done. Because the key is the same size as the plaintext, every possible plaintext is equally likely and it is impossible for an attacker to tell when the correct decryption has been derived. No brute force attack is possible against the full key space. See e.g., Schneier, *Secrets and Lies: Digital Security In a Networked World* (Wiley Publishing, 2000).

Some streaming ciphers attempt to approximate a pseudo OTP operation. In such scenarios, the transmitter and receiver independently but synchronously generate the same key. Because the keys are calculated and not truly random, they can sometimes be cracked (the key is insecure because it is calculated) but may provide adequate security depending on the context and cryptographic algorithms used. Streaming cipher calculations can sometimes take considerably more time than a single add or exclusive OR operation as is used in certain one-time pad implementations, but this calculation time can have different impacts depending on context.

There are a number of important hurdles to successfully implementing an OTP system, including key storage and distribution, key material replenishment, etc. Beyond perfect secrecy, the potential practical benefits are: simplified hardware and software complexity; lower energy and computing resources costs—at the CPU, device, system and network levels; extremely high execution speed in both stream and block cipher modes; vastly expanded access to security for simple electronic devices and sensors.

OTPs are typically created using Random Number Generators ("RNGs") and distributed from a single location to authorized recipients in paper or digital form. In OTP cryptosystems, the variable length keys used to encrypt messages are at least as long as the messages themselves (noted above), which differs from cryptosystems using fixed length keys and complex mathematical algorithms. Guessing the correct OTP key used to create a ciphertext is possible but ultimately useless because there is no way to know the correct plaintext has been recovered. Any number of guessed keys can produce any number of valid plaintext completely unrelated to the target plaintext. Conversely, any number of messages of the same length encrypted with the same OTP system all using completely different keys can produce the same exact cipher text. As such, correctly guessing one of the keys leaves the cryptanalyst no closer to recovering the plaintext of interest. There is no possible brute force attack against the key space and more fundamentally against the cryptosystem itself.

Converging on a provably secure cryptosystem is more important than ever as the Internet of Things ("IoT") is now changing the computer technology landscape and will fundamentally transform the way we think about data movement. Annual IP-based traffic alone will surpass the Zettabyte scale in 2016, which will require a commensurate amount of security infrastructure to protect it. (A zettabyte=1 billion Terabytes, an impossibly large number for the human mind to comprehend.)

To say the current security architecture is woefully inadequate to address the challenge is a profound understatement because it does not account for the proliferation of emerging non-IP based data transmissions and new communications on the near horizon. To extend existing systems to fully encrypt and secure these evolving network structures would be, at a minimum, an epic engineering and design problem consisting of countless moving parts and thousands of man-hours in research and development. Complex systems break and are compromised in complex ways rarely understood or appreciated by their naïve makers. The essence of modern day hacking is based on this principle and only grows with technical complexity—an unsustainable paradigm for the IoT, which promises enormous growth among the connectivity of disparate systems of devices.

Note for modern systems, the longer the key length, the more secure it is considered. However, the longer the key, or the more complex the computation to resolve the key, requires increasingly more computing power. As data from more and more devices in the IoT is required to be encrypted and unencrypted, more and more power is required, taxing batteries of non-hard wired devices. A reduced key size (or "weight") and/or a simplified computation protocol, but retaining all of the robust security is needed.

Reducing complexity and increasing security requires starting at infinity minus delta and moving backwards. OTP, as opposed to modern systems like AES-256 and ECC, can only be cracked if the implementation was flawed while proper implementation is invulnerable no matter the computing resources available, quantum or otherwise. Breaking into all existing systems will happen with enough resources while OTP is invulnerable to computing advances stemming from Moore's law. OTP is also "light weight" and can be computed using simplified algorithms.

Beyond cryptography, but part of the background of the inventive concept, is that of natural resonance and synchronization networks. In physics and nature, two (or more) entities resonate when one sends a signal causing the other to vibrate (oscillate) at the same frequency. This signal can be transferred simultaneously across many members of a group so they are all said to be in "resonance". An example is when a singer hits the exact note needed to vibrate a wine glass so it "sings" the same note (oscillates at the same frequency). Or when tuning a piano or guitar to the same frequency of a vibrating tuning fork tone.

In quantum mechanics and string theory, only certain types of vibrations are allowed, which is what all particles and forces are at a fundamental level—disallowed vibrations cannot exist. There are biological examples as well, such as Pteroptyx fireflies filling up large trees with millions pulsing in unison, as if they were all one giant light even though they are separate insects. This doesn't happen instantaneously and different groups will pulse at different rates and at different times. "Coupling" is when a group and a particular insect have sympathetic oscillations—from a distant observer's perspective, they are like two strobe lights harmonizing. The insect's own pulse frequency is "coupled" to that of the group. The group becomes synchronized with the substrate of these coupled oscillators (the insects) forming a synchronization network.

Turning back, the centralized public key encryption systems at the heart of global internet security protocols are inadequate for the IoT and emerging technologies on the near horizon. The care and feeding of the complex infrastructure required to sustain it has consistently failed, resulting in hacks of major corporations and individuals alike. With the advent of quantum computers in the coming years, it is vulnerable to brute force attacks and needs to be replaced with a more powerful cryptographic paradigm.

SUMMARY

Resonant Cryptography ("RC") is a highly scalable, exponentially more secure and dispersed technology that will replace the current reliance on archaic tools first outlined more than two generations ago. It will push network security down to the fog layer where devices interact directly and evolve a highly resilient web of secure global connectivity. This will be the Crypto-Foam.

The battle to make devices/hardware/software perfectly secure has already been lost. The signature based tools of firewalls and antivirus software have failed because they cannot predict the future profile of infections. Most of these technologies have now converged and different commercial vendors are largely indistinguishable. Consequently, anti-virus software, firewalls, etc. are a dying business—the differentiating characteristics and advantages among companies has largely been competed away. No unique combination of security tools stacked in a perfect alignment exists. The basis for the modern CISO's approach is the old "how fast do you have to be to be to outrun a bear attack" idea. My company must be a harder target than my nearest competitor. However, if your company is a priority target entity at all costs, say by a determined and well-funded state actor, escalating resources will be deployed to break into the network normally reserved for the hardest targets.

The RC model essentially flips the security paradigm—the assumption is software and hardware will always be flawed and vulnerable, but when they couple to multiple randomizing data streams obfuscating their activity, they are inherently more difficult to attack and consequently exponentially more secure. Pattern and signature analysis for flaws and weaknesses is defeated by a diffusion of apparent noise. All secure content and communications appear to be randomized number sequences only varying in length.

RC is a radically different approach to cryptography and security for all communications, especially IP based systems and beyond, and ideally suited for the IoT. RC creates an environment of random number signal generators, a subset of which can be received by user devices agreeing to communicate. These agreed upon signals are used the same way a one-time pad works to instantaneously encrypt data between the users or among groups of users. This is stream encryption not block encryption, but it may be implemented in any format.

In RC, no central key authority is required or complex system of crypto infrastructure, which means no one actor has a universal backdoor and it is virtually impossible to crack (stronger than AES or ECC). RC pushes communications security to the network edge, where devices interact using diminishing computer resources required to secure a system. RC requires far less computing resources on mobile devices to encrypt and thus uses far less energy while nearly eliminating latency associated with encryption (a core battery issue in all modern mobile computing technologies).

RC involves a collection of devices called crypto-resonators which send out a constant IP signal of random numbers, akin to an internet radio station. In some examples, these are static streams, other examples allow the crypto-resonators to respond to their environment and the number of users on the system.

Examples of RC use a distributed network of crypto-resonators to create streams of OTPs for encrypting communications. Devices may access one or more of these continuous streams to create a unique OTP used in symmetric or asymmetric encryption schemes in block cipher or stream cipher configurations. In other examples, multiple streams may be combined in complex ways to produce inimitable OTPs with high entropy. These crypto-resonators streams may also reactively embed outside streams of data, either random or non-random depending on the purpose. Multiple devices may securely communicate or cryptographically "resonant" by agreeing to use specific OTPs. A secure encrypted channel can be established when all participants are in a state of resonance with each other and the selected OTPs.

Using the standard nomenclature for an example, Alice wants to communicate with Bob in secret. In the old days, they each had an OTP with a very long list of random numbers that could be used to encrypt and decrypt a message. When the list ran out, they got a new pad and started from the beginning. This is perfect encryption because there is no way to guess the order of numbers in their OTP. With RC of the present invention, they can now do the same thing. They could each agree to "couple" to a particular set of crypto-resonators, at a certain time or place, which are continuously streaming random numbers. Since they agree on this unique stream of numbers to be the effective "key" to their crypto system, they have started communicating with the invention's one-time pad.

They never reuse any part of the key because it is constantly changing nanosecond to nanosecond. No one needs to be the key-master and Alice and Bob can communicate securely without a third party brokering the crypto exchange. This is a peer-to-peer secret exchange without having to store or protect a secret key. There is very little risk to anyone guessing the correct combinations of time, space, resonators, etc. that Alice and Bob used and it doesn't make sense to store every possible combination because this quickly becomes an intractable computing problem known as NP-hard. This is significantly harder to break than AES or the equivalents and is resistant to attack even by future quantum computers—which all the currently used algorithms for public key cryptography are not. As such, RC is immeasurably more secure.

Other examples allow devices to passively receive the crypto-resonators stream or streams to create unique OTPs with or without alerting the network those streams are in use. These may be effective public or private broadcasts of these crypto-resonators streams and may be available freely, by subscription/membership or exclusive use and any variant thereof. Devices may connect directly or through proxies.

Devices may have their own crypto-resonators which can couple to the network of crypto-resonators by perturbing the network crypto-resonators with the device-transmitted crypto-resonators, to further increase entropy and create an entangled state between the network and the devices using it for encrypting communications. Any device can also connect directly to other devices with device crypto-resonators.

Any element in the network may respond to any device by incorporating a unique signal from the device, which may detectably alter one or more of the crypto-resonators. This is tantamount to a signal to other devices knowledgeable of this unique signature, which may or may not appear to be identical to the regular crypto-resonators stream. It may be used for any number of reasons beyond signaling, including initiating a secure session, flagging the exact OTP block to be used, etc.

Streams may be buffered or captured for recursive inclusion in any live crypto-resonators stream. This recursion creates a feedback loop of historical crypto-resonators streams which impact live streams in a dynamic way. This may be achieved by simple interweaving of random number sequences to complex randomization techniques for merging the live and historical crypto-resonators streams of data. This may be used for multiple purposes including increasing entropy, signaling and entanglement.

One or more networks of primary crypto-resonators and a plurality of device crypto-resonators can be recombined to create secondary and tertiary streams of OTPs allocated dynamically or as a static, regular transmission. These recombinant streams may be used to create new crypto-resonators and serve recursive schemes.

Other examples allow a dynamic live encrypted data set to be made available publicly or privately with each entry encrypted by a unique OTP using either network or device crypto-resonators. Each data point resonates with the same OTP accessible to authorized viewers. A single data set may react to multiple OTPs to create tiered levels of access controls over the data, where some users may only view a subset of the complete data set.

In a geo-fence example, a physically or logically isolated crypto-resonators or constellation of crypto-resonators can be used to establish a cryptographic perimeter or "geo-fence" around a group of authorized user devices. All communications and data inside this geo-fence are coupled and encrypted by a unique set of OTPs derived from these crypto-resonators which are inaccessible to anyone outside the geo-fence. The boundary of this set of crypto-resonators serves as an effective checkpoint for entry/exit into a closed encrypted network. These crypto-perimeters may overlap and have shared boundaries supporting complex access authorization schema.

A crypto-resonator's signal may be non-randomly altered by merging it with a second secret data stream at the crypto-resonators device creating a "ghost signal" and new data obfuscation layer. While the crypto-resonators continue to broadcast an apparently random number stream, it now carries an embedded ghost signal which may be detected by authorized recipients using the correct filter to distinguish it from the normal crypto-resonators stream. The ghost signal may be a data set or a separate set of crypto-resonators to be used as an OTP or with an OTP.

Using one or all of the above, series of OTPs can be created and used to encrypt and archive data which will not change over time. The unique OTP is created and stored during a window in time associated with the data set from a series of crypto-resonators existing in the same time window.

Going deeper, some of the network of crypto-resonators can be connected to the internet and accessible via any connection from anywhere, via VPN or otherwise. These may be wired or wireless connections, the only requirement is direct access to the internet or similar communications system. Others may be completely disconnected from the internet and be tantamount to radio beacons accessible by Bluetooth, Zigbee, NFC, WiFi, LiFi, IR, etc. Still other examples of crypto-resonators can be mobile signals connected to user devices, cars, virtually anything that moves including satellites and submarines. Users may find and connect to each other by almost any application in existence today—phone number, email address, Facebook, Twitter, etc. The same holds true for connecting to networks and devices or in groups, it is not limited to person-person communications. It is the overlord security technology that could effectively and securely connect anything, not just computers.

In the same way that GPS uses data from multiple satellites to geo-locate a device, a group of secure communicators can agree to couple to a specific set of resonators simultaneously—effectively sharing the same OTP. This may be any combination of public and private resonators accessible to everyone or only a small private few (by subscription or design). They may be based on geographic location or logical connection across the internet. The exact relationship is irrelevant, only that they all have access to the same crypto signal continuously. In situations where proximity is obvious, such as all people inside a company building, this is trivial. A series of internet-disconnected beacon-like resonators is sufficient to secure all communications in the building because a distant observer cannot hope to capture all of these low power signals, even if they are across the street. This will work room-room and floor-floor to "geo-fence" communications. It is self-limiting because a single compromised device transmitting a signal beyond the building does not help an eavesdropper because it is impossibly encrypted—there are few ways to differentiate random number sequences. For example, a cell phone used for intra-building corporate communication can easily transmit to the nearest cell phone tower, but the internal communications, even if captured by the device and re-broadcast, only sends encrypted VOIP or text. Decryption into plaintext only happens at the end points where the trusted users reside. Anything captured mid-flight is encrypted.

The power, computing and other resources that are saved in the examples of this invention are obvious. Instead of maintaining centralized and constantly updated security systems with certificate authorities and network administrators, the security of the infrastructure and communications can be vastly improved at less cost with less fundamental proven risk—there is no central authority to attack and compromise to break into an entity. RC users do not need to alert RC generators their signals are being used.

Simple low CPU-intensive and thus power saving algorithms can be implemented to further increase security and customize solutions for different applications, clients and user bases. For example, the combined OTP may not be a simple false addition of multiple resonator streams of numbers. Any admixture of the streams will do, like shifting one stream by a few milliseconds or performing simple mathematical operations on any combination of the streams to create a unique crypto product. Blinking one stream on and off or multiplying it by a large prime number are all options. Similar techniques could be used to create a hierarchy of privileges in a single session—some participants will see all of a communiqué and others will only see/hear a fraction of it.

There are huge advantages to setting up a new dispersed and distributed crypto system, which is similar to other types of networks in that there is "no central authority" nor any universal way to use the crypto. Also, there is nothing like a public record similar the block-chain—RC is all-private. It is entirely secret and there is no danger of capturing a message and decrypting it later with future quantum computers and such. There are numerous fine points that increase the sophistication of the deployment and broaden the applications beyond simple message exchange—banking, e-coins, VOIP, chat, etc. It is not unlike a mesh network with crypto resonators at each node. Every node can be connected to every other node, which are all continuously streaming pseudo-random numbers 24/7. Choosing a one-time pad in this network is the same as picking a path through all or some of the nodes. Each link adds more complexity to the encryption stream because no one person owns all the nodes—they are tolerant to any number of nodes being compromised by an enemy who wants to steal RC encrypted secret information. Any nefarious eavesdropper would actually increase the security of the system by participating in it, which is a powerful feature.

The longer an RC user's path through this web, the harder it is for someone to recreate it and break the secret. Also, the path is not fixed—it changes second to second, so an adversary would need to know the exact nanosecond a user got onto the path. Furthermore, they would need to know the algorithm an RC user's application is using to encrypt messages using this random path. Also, the mixture of crypto signals, timing and other factors exponentially grows the resources needed to break it. This system has an important property in cryptography which can be stated as "it is computationally easy to encrypt and decrypt the messages in a group, but intractable for an outsider to conduct a brute force attack to do the same." Recording every signal is impractical because of the vast volume of data storage required—far beyond the known storage capacity of all the computers in the world today. Also, the geometric increase in the number of permutations of these signals to re-create a single OTP is prohibitive. With a small number of crypto-resonators, the number of combinations would quickly exceed the number of particles in the universe.

Other examples solve the proximity problem—far away attackers cannot simultaneously synchronize their attack vectors with the state-dependent environment of the RC user. This means attackers are always at a disadvantage because they cannot parallel the secure exchange between RC users—they can never resonate in harmony with users inside this cryptographic circle of trust. Furthermore, it defeats man-in-the-middle attacks because RC-users enjoy parallel streams of encryption across many encrypted channels—the eavesdropper must intercept every channel simultaneously to recreate a single message and then decrypt it. There is no central crypto key to steal and break into a company's repository of secrets. There is only an ephemeral state of lucidity in the RC crypto-space accessible to privileged users for any moment in time. There is no master key to open every locked file. Encryption happens not in blocks of data, but in a stream of random numbers with embedded information of arbitrary size and scale flowing in a network.

In the RC model, the travel time of signals is important because light crosses fiber optic networks around the world's routers, data centers, etc. to connect end users to desired data—this signal has a fundamental speed limit and delivery time dependent on the infrastructure it crosses. Two users may receive information from the same server at slightly different times based on these multiple factors. Because modern crypto keys are time-independent, anyone who steals them can decrypt every encrypted message from a company's network back to the beginning of time or as long as the keys were valid. RC is completely different—unless an attacker has a time machine to capture a communiqué and decrypt it in the future. Any system in a resonant state would be fundamentally difficult to hack because a hacker would have to be very nearly physically on top of the potential victim or the travel time for the signals would be different and thus not resonant—they only see encrypted data unless they can thoroughly parallel the RC user's behavior moment to moment. The temporary resonance a hacker may enjoy becomes de-coherent over time and space as the secure tunnel is established between trusted communicators—the hacker goes deaf almost immediately, even if they have excellent access to parts of a network.

No software/hardware combination can secure itself and *commune* with the outside world in a meaningful way. Vulnerability increases with complexity while RC serves as a counterweight—it reduces the overall attack surface of the system available to an external hacker. It also makes crypto measurements of a system technologically prohibitive. For example, can a hacker or state-level attacker capture enough data to fully characterize and exploit an RC system—Yes, it is theoretically possible but the resources required to do so would be economically and practically unfeasible. Also, the exploits would only be temporary and have no relevance in the immediate future.

In examples, while some crypto-resonators are just random number beacons passively broadcasting data—the user need not alert the resonator the signal is being used—others are interactive like a VPN connection to a website. Each such coupling may be prepared in such a way as to disturb the resonator for everyone also coupled to it. This has the property of perturbing the system connected to it and letting everyone know another device has joined the network—a pulse basically runs through the normal state of random number generation to include information about the new participant and the timing of their arrival. A unique signature may be added to the new random number sequence to reflect this user's couplings to other resonators which guarantees harmonious participation in the private communications. An interloper's attempt to join will be recognized immediately and they will be unable to connect in effect.

RC has strong implications for identity management and mobile banking. While one or two data points for multi-factor authentication are even now known to be insufficient, nothing less than five or more will be essential in the future. With each new data point, the problem of the imposter becomes more difficult. Ordinary biometrics like thumbprints will not do it alone. These have already been copied, scanned and used by criminals on iPhone touch pads and related sensors. Stronger biometrics require users to acquiesce to highly obtrusive facial scans and, one day likely, DNA itself. This will be both offensive and unacceptable to most Americans—the thought of being tracked as in the movie Minority Report. However, almost everyone is happy to carry and wear electronics using apps that are big data collectors on the individuals using them. The difference is a person can opt-in or opt-out of most collection and they always have the false sense of security that they can choose to remain anonymous.

Anyone can buy, register and use a smart phone, iPod, Fitbit, sports band, etc. all in alias and never allow these companies to have detailed information about the user—the fear being it could be used against the individual for insurance purposes, college admissions, etc., and other privacy concerns. With RC, powerful non-biometric authentication can be realized without any loss of privacy nor any attribution to a person's true identity—this is important for e-currencies and online transactions. A person is a "match" for a transaction if a combination of an arbitrarily large number of public and private RC resonators agrees. The decision is up to the person or institution—more couplings lead to more security and lead to a more intractable hacking problem—this devolves to the level of Point of Sale in a department store. Furthermore, any hack, if a technique is ever discovered, is only temporary. It is only good for a single transaction or session—it is not the same as stealing a credit card number and supporting credentials nor does it carry the risks of someone stealing a person's digitized biometrics—a person cannot get a new face or fingerprints to mitigate the damage. With RC, a person just begins a new session and the hacker is back to square one. Security layers evolve far faster than hackers can hack them because the complexity grows exponentially not linearly.

Static data storage can be encrypted using a similar system in a variety of ways. For example, some resonators could transmit a continuous repeating signal on an arbitrary time scale depending on the required level of security needed, from nanoseconds to months or years. A unique OTP could be generated from this signal as a mathematical combination of a public and/or private record of which there are multiple copies. The "key" to replicate this OTP on-demand without having to store a massive OTP could be a simple time and signal combinatorial function for that data set. Due to the enormous number of functions combined with the number of resonator sequences the resulting number of OTP possibilities is significantly harder to guess than any current encryption scheme generated using superior computing hardware.

Yet further examples of RC include connection cascading—rapidly perturbing the system of resonators with each new user until only the circle of trust can be firmly established and no third party could replicate the pattern. This allows networks of resonators to be formed and mutually conspire to increase the overall randomness and security of the system itself. Another key point to remember is every element of this construction is easy to validate. OTPs are simple to understand and everyone has experienced resonance in some form or another.

Padding cipher-text—streams of nonsense data can be used to pollute the system with no computing cost to validated users. This further increases the required computing resources to attack the network of resonators and can be used to obfuscate the timing of messages—users are continuously broadcasting, but only a minority of the transmission is real cyphertext.

Complex client-specific solutions—customization of the RC algorithm for a client is a matter of calculating the mathematical advantage of any equation. These are tantamount to giving the client an acceptable palate on which to build their own crypto-solution using RC core principles and networks.

Simple examples of applications can include a continuous OTP stream cipher used to encrypt and control access by subscription to any content delivery network (CDN) or live stream of any type of data. Although a number of public RC points could be used for bulk encryption, a single control RC point could be used to manage user access because any one element of the RC feed could cut off service to unauthorized recipients. This is akin to widely broadcasting encrypted data over the air without risk of anyone but intended users getting access—this also applies to the hierarchy of access model where the same bulk encrypted stream could allow varying levels of use and decryption. For example, a provider may want to give tiered paying clients more content to premium content or services while still securely offering the core product to non-paying users.

Further examples of peer-to-peer encryption can allow users to send each other small encrypted packages, such as hashed identities with a random or fixed session key. This small attachment may create a unique stream from a single or combination of resonators by altering them in a meaningful way, such as adding a transcendental multiple, permutation, deletion and other low CPU-intensive calculations.

Thus, because Crypto-Streaming allows any resonator to provide a live crypto stream to transition from static to dynamic time-based connectivity and information flows the examples above and below become useful for encrypting perpetual data streams in real-time instead of performing cryptographic operations on data at rest in a single physical or cloud location. As such, live data is transformed into streaming encrypted information.

As the nature of computing evolves into an always-on model of information pipes, RC will become the essential ingredient to secure the next evolution of the internet and post-IP networking. This always-on state is very different from those in existence today, primarily because it will not necessarily involve the active participation of the end-users. Per the requirements of the end point devices or users, information will flow as needed or prescribed by the users or owners of the systems not unlike a continuous news feed based on user content preferences. While the internet is always-on today in the sense that global networks are in continuous operation, the next always-on state will be far more dynamic with far greater volumes of information moving autonomously by design. Machine learning will replace human decision making on information traffic and create a more efficient and refined utilization model.

As the Internet of Things (IoT) emerges into a universal sensor network responding directly to changes in the technological environment it services, the secure movement of sensor data to protect against data corruption or manipulation requires a more fundamental layer of security embedded into the streaming of information itself. Passive or active RC coupling to these devices to creates a strong cryptographic framework to obfuscate the data and relationships among various data streams. This is important to prevent information traffic analysis, characterization and ultimately hacking. Layered RC networks using crypto-streaming techniques over any sensor network highly complicates the task of breaking into the network and studying its behavior. Thus, it is strongly secured and no single point of failure or attack exists, which is a new paradigm far from current systems.

For example, a single compromise of a centralized cryptographic server or key store may allow an attacker total visibility into the network it serves, including the ability to decrypt any packets transmitted or received from outside the system. In the RC model, this vulnerability is overcome by forward distributing and diversifying the cryptographic material used to secure a system. Even if all parts of this model are well understood, captured and compromised by an attacker, secure communications among users are still easily achieved and may still be considered secure from eavesdropping by other attackers not privy to the compromised material. In this sense, the RC model is highly resilient and more secure beyond the provable high strength of OTPs. End point users wishing to directly communicate may have unique and private encryption implementation protocols using a compromised RC network.

A resonator can include a random number generator. The RNG can include at least one of a true random number generator, pseudo-random number generator, or any non-repeating sequence of numbers having a characteristic of a random number stream. As above, the random number generator can generate a first stream of random numbers. The resonator can include a transmitter which can be electrically coupled to the random number generator. The transmitter transmits the first stream of random numbers by at least radio frequency or through a network. The resonator can also include a receiver to receive streams of numbers from other devices discussed below. One of ordinary skill in the art readily understands that the transmitter and the receiver can be in some examples one in the same element, a transceiver. This includes any processing required to either send or receive the streams.

Also included can be a processor integrating a second stream of numbers into the first stream of random numbers for form a combined stream and a non-transitory resonator memory to store data. The second stream of numbers can be received from a second resonator or other user device discussed below.

A communicator can be used to communicate with the resonator and other user devices. Communications in the context of this invention include receiving random number streams from one or more resonators, transmitting communicator numbers to the resonator and communicating with other communicators to exchange plain text and encrypted communications and the algorithm to generate an encryption key.

To facilitate these capabilities, the communicator has a communicator receiver which can receive the first stream as well as a communicator crypto engine which can be electronically linked to the communication receiver. The crypto engine can also include a non-transitory memory and a processor electronically linked to the memory. One example of the communicator crypto engine's tasks can be to read at least a portion of the first stream and to convert the portion of the first stream into a cryptographic key.

In further examples, there can be a second or further communicators as part of the system, these additional communicators can have more or less capabilities that the communicator described above. When the first communicator communicates with the second, for example when Alice communicates with Bob, as described in the many examples above, the first and second communicator processors have a common algorithm to independently convert the portion of the first stream into the cryptographic key. This is one of the advantages of the invention, neither Alice nor Bob have to share a key, they each generate their own independently. This key is also generated only at the time it is needed, so it is not stored, waiting to unlock data in the future. This increases security since the key does not need to be transmitted, it cannot be intercepted. Also, since it is generated on the fly for each data set, the possession of an old key does not permit the decryption of any future data, or past data other than the data the key was generated for.

To include some hardware into the examples above, as already noted, the communicator receiver can receive a second stream of numbers from a second resonator. The non-transitory memory can store at least a portion of the second stream. The communicator processor can then read the portion of the second stream and uses both portions, to create the cryptographic key.

Other examples have that the communicator also includes a communicator number generator that can generate a communicator number. The communicator number generator can be a RNG as described above, to generate random or pseudo-random streams to be inserted into a resonator's stream. The communicator number generator can also generate non-random streams that can be used to identify the communicator or in coordination with the crypto engine, to insert messages, as described below.

The communicator can also include a communicator transmitter transmitting the communicator number, to the resonator. The resonator receiver receives the communicator number, and resonator processor can integrate the communicator number, into the stream of random numbers to form a combined stream which can be transmitted by the transmitter.

In other examples noted above, once the communicator number is inserted into a combined resonator stream a second communicator can receive the combined stream and detect the communicator number. Once so informed the second communicator can generate its own (a second) communicator number. The first and second communicator numbers can now be sent to the resonator to be combined with the resonator stream to make a second combined stream which can be transmitted by the transmitter.

Yet further examples of RC involved the timing of the streams. So, the resonator transmitter can transmit a portion of the first stream at a time T0. This T0 first stream can be recorded, either by a second device (like a communicator) or the resonator itself. Regardless of what device records it, the T0 first stream can be stored in the resonator memory (i.e., it was already there if recorded by the resonator, or it can be received back through the receiver when recorded elsewhere). The processor can now combine the T0 first stream with a portion of the first stream at a time T1 to form a recursive stream that is then transmitted.

Other examples using the timing of the streams include a data set 302 having at least a value V1. Here, the resonator transmits a portion of the first stream at a time T0 and the communicator crypto engine can encrypt value V1 using the T0 first stream. The resonator can also transmit a portion of the first stream at a time T1. This can allow the communicator crypto engine to decrypt value V1 using the T0 first stream and reencrypts value V1 using the T1 first stream. Amber crypto, as noted above, is another example of using a time segment of a stream. An amber non-transitory memory can store the T0 first stream and a data set can be encrypted using the T0 first stream.

More examples of using multiple resonators and/or multiple communicators can result in the recombinant stream described above. Here, the second resonator transmits a second stream of numbers and the communicator can receive the first and the second streams. The communicator crypto engine can combine the first and the second streams, to form the recombinant stream which can be transmitted by the first communicator transmitter. The recombinant stream can be typically formed when the first communicator crypto engine applies an algorithm, in one example Frc(n) to the first and the second streams, to form the recombinant stream.

Other examples can result in "ghost" communications. Here, the first communicator number can be a clear text message transmitted to the resonator using a first sequence to form the combined "ghost stream" of the first stream and the first sequence of the first communicator number. Then a second communicator can receive the ghost stream and its crypto engine applies the filter filtering the first communicator number from the ghost stream. Note that any number of resonators and their streams can be used to divide the message between.

The geo-fencing examples can also be discussed. Herein, the resonator transmitter is a short range transmitter and a transmitter signal range defines a geo-fence area. When the communicator receiver receives the first stream of numbers inside the geo-fence area the communicator crypto engine can create the cryptographic key needed to access whatever data sets or hardware are part of the geo-fence area. Conversely, when the communicator is outside the geo-fence area, e.g., can no longer receive the transmitter signal, the communicator crypto engine cannot create the cryptographic key. This can be easily noted, since if a user cannot access the proper resonator, it will never have all of the information needed to read the encrypted information.

The following examples describe the methods of using RC in steps. Note that these steps can be performed by the hardware discussed herein and can be embodied in either specially designed hardware or in software running on typical or proprietary hardware.

An example of a method to encrypt and decrypt data using resonant cryptography, these are the basic steps of the resonator, including generating a first stream of random numbers using the resonator and then transmitting the first stream of numbers using a transmitter. The figure further includes the method of basic entanglement, which can include the steps of receiving, at the resonator, the second stream of numbers. The first stream and the second stream, can be combined, using a processor at the resonator, to form a combined stream and then transmitting the combined stream with the transmitter.

Some of the examples involving the communicator include receiving the first stream at a communicator and then storing at least a portion of the first stream in the memory of the communicator. The processor of the communicator can convert the portion of the first stream into a cryptographic key. This can be done using an algorithm.

Adding at least one more communicator allows two parties to securely communicate. This method has the second communicator receiving the first stream and storing a portion of it. The second communicator can then convert the portion of the first stream into the same cryptographic key using the same algorithm. As above, this allows Alice and Bob to communicate using the same key, but generated independently and in some examples, on-the-fly.

An example of the use of multiple resonators allows the communicator to receive the second stream of numbers generated by a second resonator and store at least a portion thereof. The portions of the first and the second streams, can be converted into a cryptographic key using an algorithm.

Combining resonator and communicator streams is an example of a method of convergence. This example has the resonator receiving the communicator number, generated by the first communicator. This step is taken from the resonator's point of view, but in other examples can easily be that the communicator generated the communicator number, and transmitted it to the resonator. However, it can be the resonator that combines the communicator number, with the first stream into a combined stream and then transmits it.

Continuing with the above example, this combined stream allows Alice to signal (or more) to Bob secretly. This method includes receiving, at a second communicator, the combined stream and then storing at least a portion of it. The processor of the second communicator can detect the portion of the communicator number, from the combined stream.

An example of a method of cascading includes where the resonator receives (or receives back) a second communicator number generated by the second communicator and the first communicator number, both transmitted by the second communicator. The resonator combines the first and the second communicator numbers with the first stream into a second combined stream and then transmits it.

Further, a method of forming the recombinant stream is where the first communicator now receives the first stream and the second stream of numbers (typically generated by a second resonator). The two streams are altered and/or combined using some form of algorithm to thus convert a portion of the first and the second streams into the recombinant stream. The recombinant stream is transmitted with a first communicator transmitter.

Examples where segments of the stream are taken at different times to get more advanced cryptographic results.

For a recursive stream, an example of a method includes generating a first stream of random numbers at a time T0 using the resonator. A portion of the T0 first stream is stored in a non-transitory memory. This storage can be on the same resonator that generated the T0 first stream, a different resonator, or a communicator. Regardless of where its stored, the T0 first stream is then sent back to the resonator to be combined with a portion of the first stream at a time T1 to form a recursive stream which is then transmitted.

Another time segment method, illustrated in FIG. 11 allows separate values publicly available to be encrypted over time. In this method the communicator receives the T0 first stream and encrypts a first data value V1 using the T0 first stream. Separated in time, now the communicator receives a T1 first stream from the resonator. The data value V1 can then be decrypted using the T0 first stream and then encrypted using the T1 first stream.

A yet further time example is amber crypto. Here an example of a method includes generating a first stream of random numbers at a time T0 using the resonator (as above). The T0 first stream is stored in an amber memory and used to encrypt a data set. However, once encrypted in this fashion, there is no way for a bad actor to listen in for the T0 stream, it is lost to time.

Ghost RC can be another powerful tool. It can be used to send clear text in public streams, Bob just needs to know which streams and which segments are ghost segments from the public segment of the streams. It can also send an encrypted message to add to its obscuration. An example of this method can be by generating at the first communicator, a first communicator number which is a clear text message. The first communicator number can be transmitted to the resonator using a first sequence. The first communicator number is combined with the first stream into a ghost stream at the resonator. The second communicator receives the ghost stream and filters it to extract the first communicator number from the ghost stream.

Another example can lead to a method of geo-fencing an area to restrict data access. One example, illustrated in FIG. 13 defines the geo-fenced area based on the signal range of the transmitter transmitting the first stream. Once defined, access to the geo-fencer data can be permitted or denied based on receiving the first stream at the first communicator. If the first stream is received, the cryptographic key used to decrypt the data in the geo-fenced area can be created.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 5 is a diagram illustrating an example of coupled resonant cryptographic exchange between Alice and Bob;

FIGS. 12A and 12B are diagrams illustrating ghost cryptographic examples of the present invention;

FIG. 13 is a diagram illustrating a cryptographic checkpoint example of the present invention;

DETAILED DESCRIPTION

Resonant cryptography ("RC") is a method of secure encryption that mimics, on what can be a global scale, the impenetrable (when implemented correctly) One-Time-Pad ("OTP") encryption method. The method, and the devices that implement it, create and utilize an environment of one or more crypto-resonators 100 to broadcast a stream 102 of random appearing numbers. A simple example of a crypto-resonator 100 is a random number generator ("RNG"). The crypto-resonator/RNG 100 can be a true random number generator, pseudorandom number generator or any non-repeating sequence of numbers with the appearance and characteristics of a random number stream. The crypto-resonator 100 can be implemented in one or more of hardware or software and generated and/or streamed by digital or analog techniques.

Figure 1:
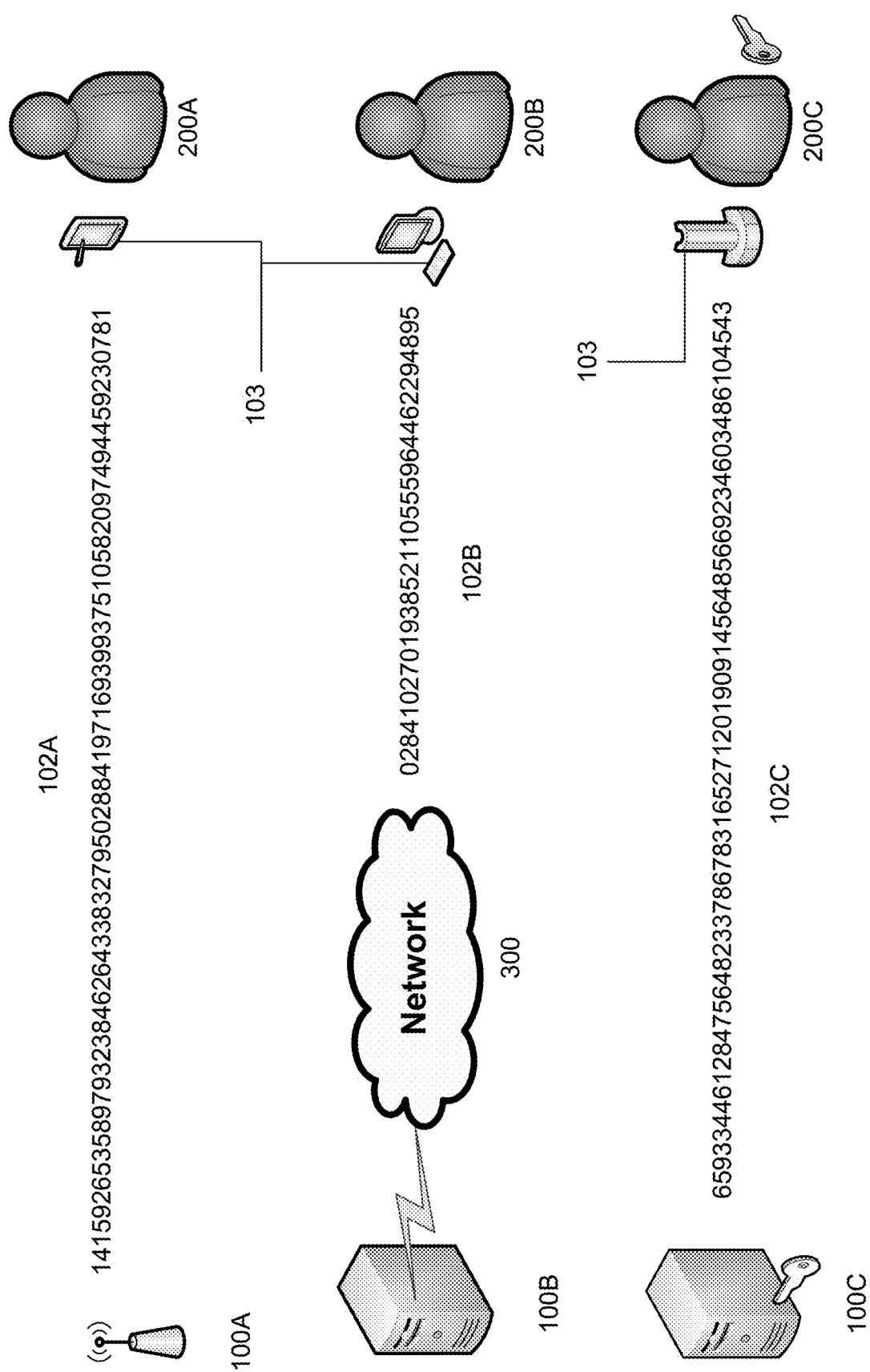
FIG. 1 is an example of a crypto-resonator network of the present invention.

FIG. 1 illustrates some examples of crypto-resonators 100. A simple crypto-resonator beacon 100A is similar to a wireless access point and generates a truly random stream of digits 102A. The beacon 100A is a public broadcast and is accessible to any user 200A within range of the signal 102A. A crypto-resonator radio 100B can generate its stream 102B by software and project it through a network 300 to any user 200B with access to that network 300. In this example, the crypto-resonator radio 100B stream 102B can be pseudo-random. The network 300 can be as expansive as the internet or as restrictive as a company Local Area Network ("LAN"). Another type of crypto-resonator 100 is a secure crypto-resonator 100C. The secure crypto-resonator 100C can allow access only to users 200C who are members (e.g. employees of a company) or subscribers who pay for the private stream 102C. In this example, the private stream 102C is a non-repeating sequence (e.g. pi or e). Note that any of the crypto-resonators 100A, 100B, 100C, can generate any type of stream: random, pseudo-random, or non-repeating, and any one user 200A, 200B, 200C can have access to some or all of the streams 102A, 102B, 102C.

Examples of the above configuration can be known as a Resonant Crypto Network. For any network of computing devices securely communicating, RC is a mesh network of resonators 100 broadcasting streams of data 102 to encryption receivers 103 (e.g. any user device or storage noted in the examples below) to generate an effective OTP in complex ways. These may be achieved by any number of algorithms, both static and dynamic, to encrypt data both publicly and privately for trusted users. It may also be used for any secure means of obfuscating data beyond simple encryption. If used as a symmetric key cipher, the key length is not fixed and may grow arbitrarily large with the bandwidth of the resonators 100 or network of resonators 100. Furthermore, the same streams maybe used by an unlimited number of users 200 who all vary their implementation, including stream encryption.

Each stream 102 can act as its own OTP for any user 200 that can access that stream 102. The stream 102 can be an actual cipher key 104 or the mathematical base for the cipher key 104. Once two users 200 agree on one or more crypto-resonators 100, and when they begin to access the stream 102 to create the key, the cipher can be created on the fly and cannot be duplicated or cracked.

A very simple example is that a first user, Alice 202A, wants to encrypt a message to a second user, Bob 202B. From FIG. 2, Alice 202A and Bob 202B agree to use crypto-resonator beacon 100A and enter stream 102A at a time T1. Thus, both Alice 202A and Bob 202B begin to collect random numbers out of the stream 102A (1971693993 . . . ). Alice and Bob 202A, 202B have also agreed to use a simple additive cipher. The message is "Hello", which when converted into numbers by position in the alphabet is 8-4-12-12-15. The first 5 digits of the stream 102A taken at time T1, which are 1-9-7-1-6, become the key 104. Add the two sets of digits together to get the encrypted message 106, which is 9-13-19-13-21, or 913191321. Bob 202B, having captured his own version of the key 104 from the stream 102A, can now decode the message by subtracting each of the key digits from each of the "letter" digits to get back the clear message "hello."

Note some key features of the invention, Alice and Bob 202A, 202B did not have to exchange keys in advance, just agree on how to generate the key. In addition, neither Alice nor Bob 202A, 202B knew what the exact key was going to be until the instant they entered the stream 102A. If they had agreed to enter the stream 102A at a moment later, say at time T1', the key would have shifted a few digits and have been 9-3-9-9-3. Thus, even though the beacon 100A is streaming 102A to the public there is no way for someone to know when to start using the stream 102A to decipher the message. The key, of course, can be made even more complex by performing more than just simple addition for the encryption algorithm.

Figure 2:
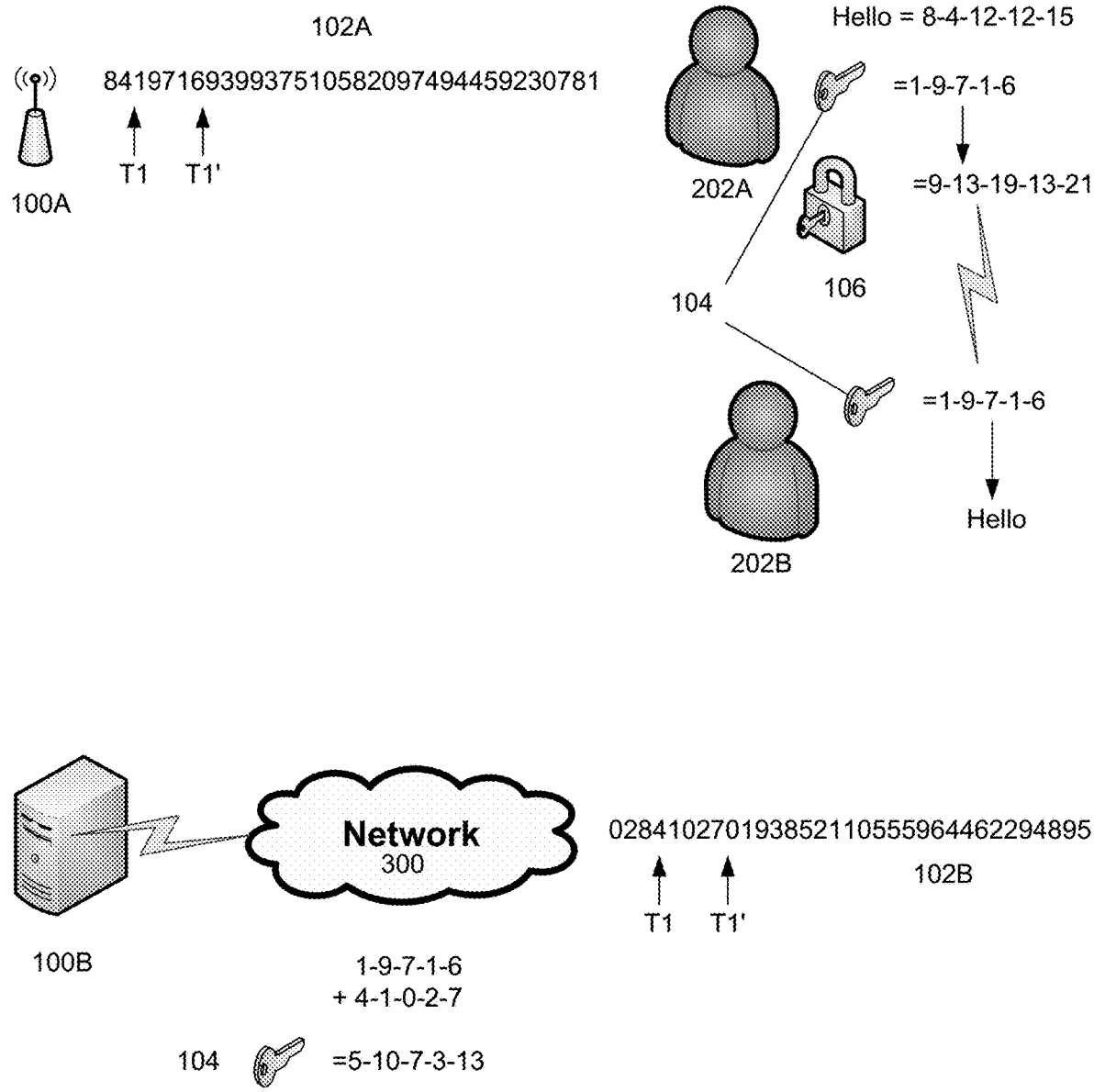
FIG. 2 is a diagram illustrating a basic resonant cryptographic exchange between Alice and Bob.

FIG. 2 also illustrates a slightly more complex encryption scheme for Alice and Bob 202A, 202B. For more robust security, Alice and Bob 202A, 202B agree to also use crypto-resonator radio 100B and its stream 102B. They enter the radio stream 102B at time T1 as well and get 4-1-0-2-7. Now, its agreed that the sum of the beacon stream 102A and the radio stream 102B is the key, thus 5-10-7-3-13, and the message is encrypted as above. Now, more and more streams can be used to make the key increasingly complex even though both streams 102A, 102B are public. Even more security can be gained if Alice and Bob 202A, 202B used the secure crypto-resonator 100C and the private stream 102C.

Figure 3:
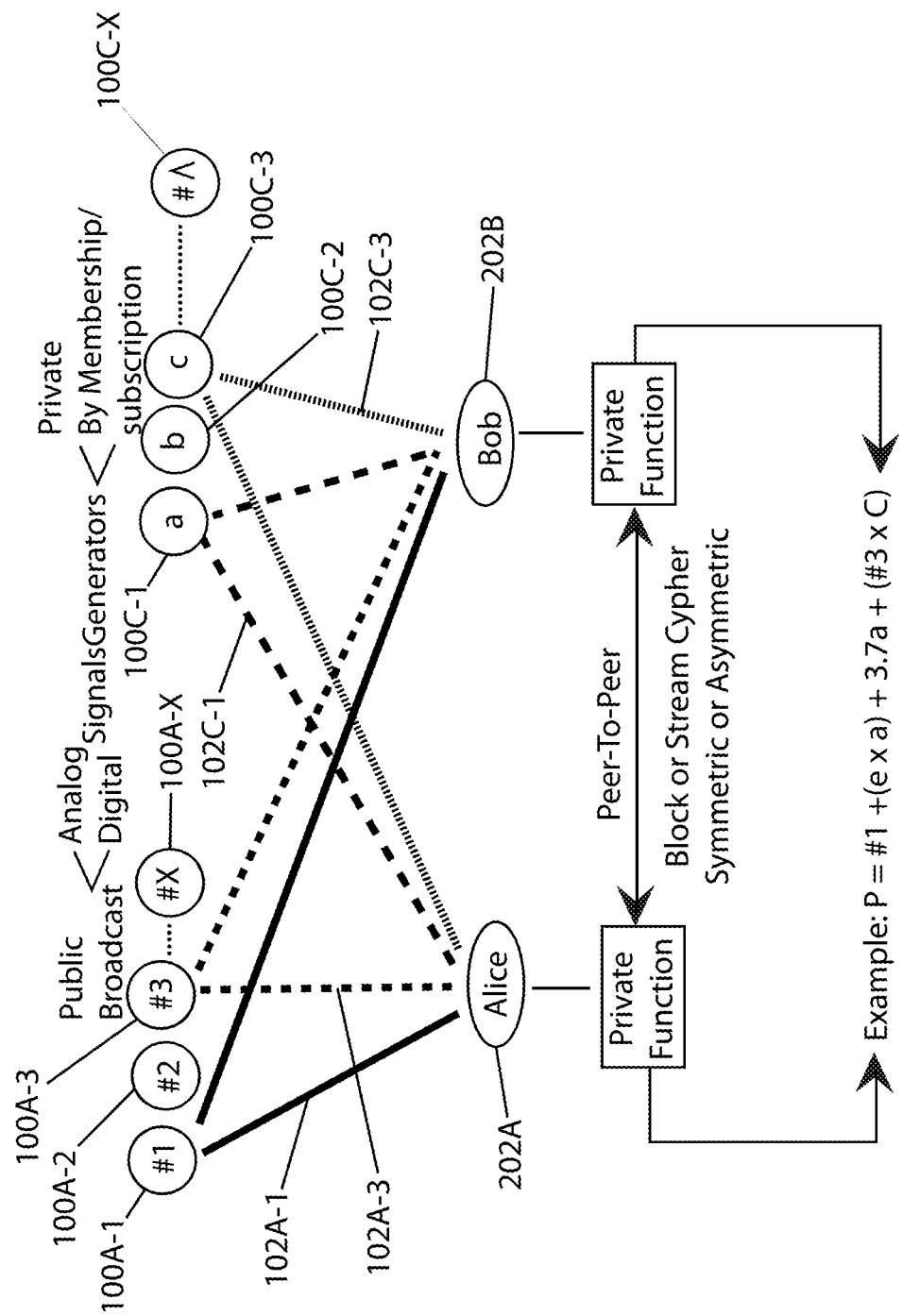
FIG. 3 is a diagram illustrating a more complex basic resonant cryptographic exchange between Alice and Bob.

FIG. 3 is yet another example with some complexity. There is a series of crypto-resonator beacons 100A-1, 100A-2, 100A-3 . . . 100A-X and a series of secure crypto-resonators 100C, which can be private or membership/subscription controlled. Alice and Bob 202A, 202B want to send a secure message "1111" at a particular time (say 0100 zulu). Alice and Bob 202A, 202B further agree to use public beacon RC #1 100A-1 and RC #314 100A-3 and a secure resonator NCOIEWUH 100C-1. At 0100 zulu the streams of each of those crypto-resonators 102A-1, 102A-3, and 102C-1 transmit the following four digits of a random number series, 0200, 1234, 9876, respectively. Alice and Bob 202A, 202B agree to generate the key by false addition (that is to say that no matter what the digits add up to be, only the digit in the "ones" column is used). Thus, the key 104 is 1200. Alice and Bob 202A, 202B again agree to false addition to encrypt the message, which becomes the encrypted message 106 "2311". Alice 202A then transmits the encrypted message 106 in the clear to Bob 202B, who already has the key 104, and decrypts the message accordingly.

Some of the aspects of this invention are apparent just from the simple example above. Even if the secure resonator NCOIEWUH 100C-1 records its entire stream over time, there is no way for a hacker to know that Alice and Bob 202A, 202B agreed to also use RC #1 100A-1 and RC #314 100A-3. Even if the hacker knows exactly which resonators, she still does not know when they decided to enter the streams 102A-1, 102A-3, and 102C-1 to start the generation of the key. Then, even with perfect knowledge of the resonators and time of entry into the streams, the hacker still does not know the encryption algorithm.

Under normal circumstances, with just a few resonators 100 operating, there is an almost zero possibility a hacker can guess the key 104. The hacker would need to have recorded every possible resonator 100 and try every combination and every time entry point (and that's even with the presumption that every stream is entered at the same point in time). Even using the simplest of encryption algorithm, this is a much more robust system then what's currently in use and provides almost perfect encryption, with a very light weight key. The key length in this example is only the length of the encrypted message 106. In addition, the capture of the streams 102 and the simple encryption algorithm is easily calculated using even the limited resources of a mobile device's CPU.

Figure 4:
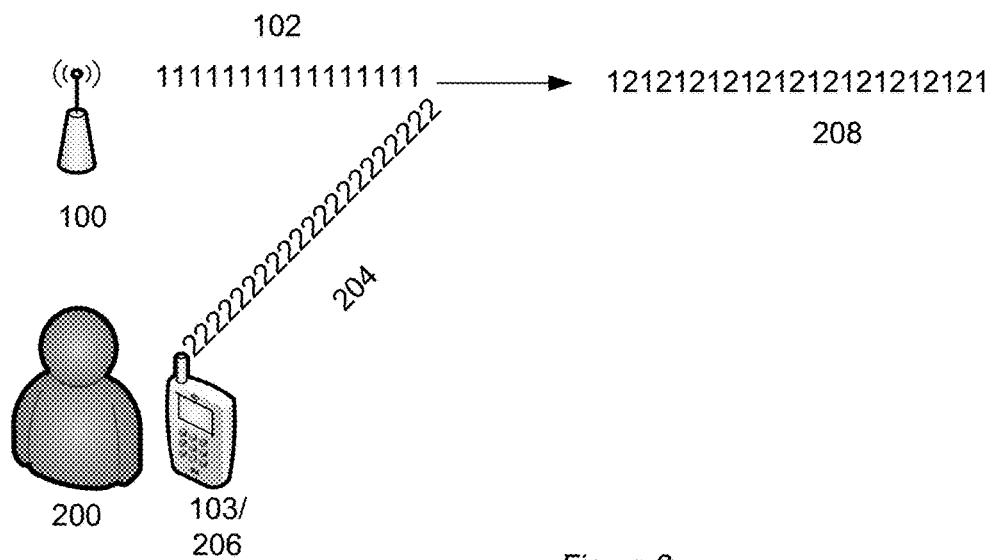
FIG. 4 is a diagram illustrating a coupled resonant cryptographic formation of a daughter stream.

Another example, as in illustrated in FIGS. 4 and 5, adds even more complexity and security to the present invention. In the above examples, the resonators 100 can be passive devices, just emitting their stream 102. An example of Crypto Entanglement (CE) allows them to become dynamic and responsive to their environment. CE is the property of any resonator 100 that allows the resonator to couple to other resonators. Examples include a small stream unique to any user 200 of RC, generated by their personal user generator/resonator 206 like a smartphone. Examples of the coupling can be as simple as the device hash combined with a time signature. In one example, the coupling can occur so long as it is not a static stream of numbers. The user 200 of resonator 100 or any combination thereof in an RC network may now become entangled over time by changing their individual streams in response to those with whom they are coupled. Each element of this arrangement evolves quickly over time to create a new crypto state where any unique characteristics of the isolated system are uniquely transformed. The combined streams are now entangled with each other establishing a complex new system.

Entanglement complicates the problem of attacking the network because each new element coupling to the closed system of communicators is detectable. Modifying the cryptographic surface in use will alert every element of the system simultaneously. It is a secondary layer of security and intrusion detection that evolves from this form using an RC network.

FIG. 4 illustrates a simple example of the user 200 interacting with the resonator 100. In this way the user 200 can broadcast from a user generator/resonator 206 a user stream 204 to insert into a resonator stream 102. To an uninformed observer, the addition of the user stream 204 is undetected as it still seems random numbers are being generated, but to an informed user, this can be used to enhance security or used as an identifier once the user stream 204 is detected in the resonator stream 102.

The insertion of the user stream 204 into the resonator stream 102 can result in any number of different actions. In the simplified example of FIG. 4, the resonator stream 102 is only "1s" and the user stream 204 is only "2s". The resulting daughter stream 208 can be a function of alternating the user stream 204 and the resonator stream 102, resulting a "121212121212" pattern. Alternately, it can be an additive inclusion, now resulting in a daughter stream 208 of "3333333333." Any other mathematical operation can be performed on the two streams 102, 204 to lead to the resultant daughter stream 208.

FIG. 5 illustrates a more complex CE example. Here, not only can the user resonator 206 couple with the resonator 100, the resonator 100 can couple with the user resonator 206. Their streams can be crossed so each affects the other, either identically or disparately. In the illustrated example the two resonators 100, 206 can communicate with each other to begin the entanglement. The streams 102, 204 are crossed and combined through one or more combination formulas, see examples above, to provide one or more daughter streams 208.

Figure 6:
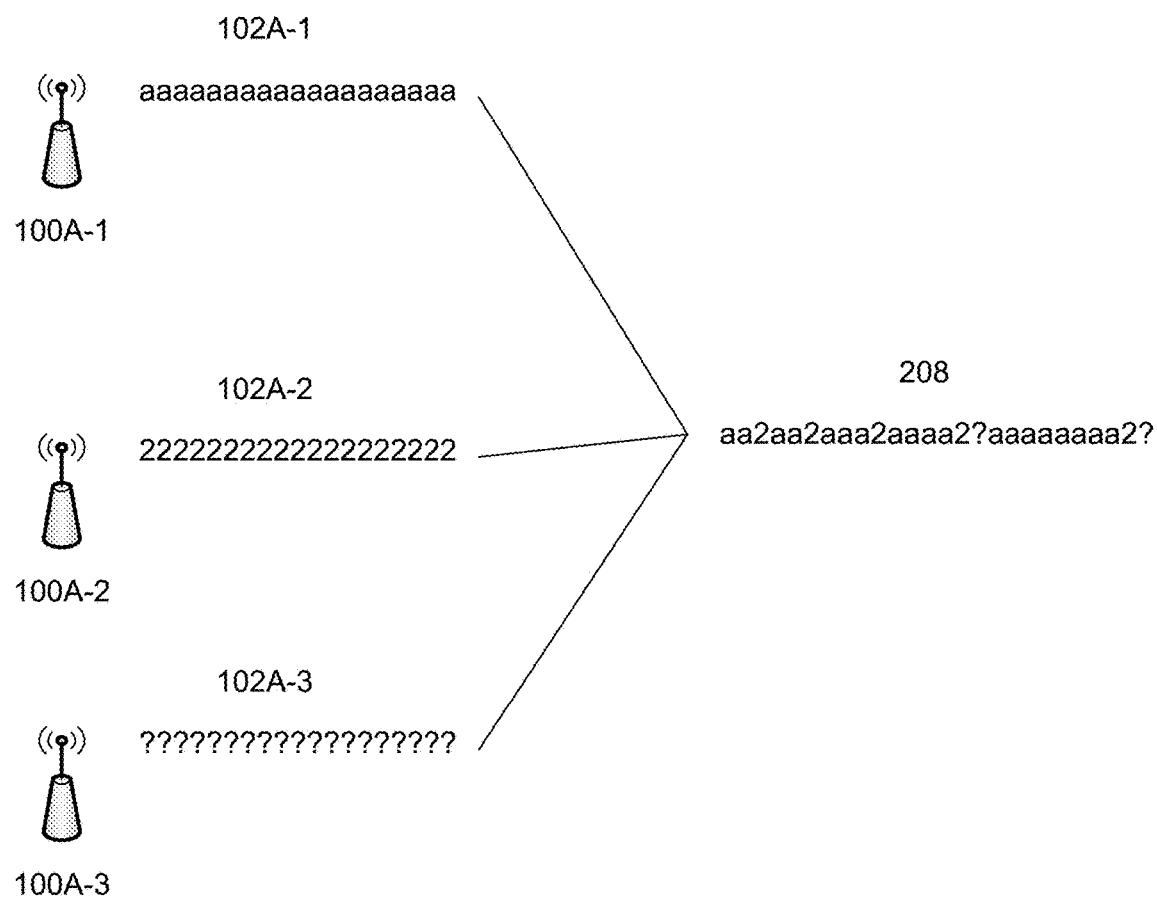
FIG. 6 is a diagram illustrating another example of a coupled resonant cryptographic formation of a daughter stream.

Another example of CE, as illustrated in FIG. 6, is to consider multiple streams 102A-1, 102A-2, 102A-3 from multiple beacon resonators 100A-1, 100A-2, 100A-3, all of whom want to couple. The first beacon 100A-1 streams "aaaaaaaaaaa . . . ", second beacon 100A-2 streams "22222222222222 . . . " and third beacon 100A-3 streams "7777777777777777?" The new combined daughter stream 208 of just beacon resonators #1 and #2, 100A-1, 100A-2, can be an alternating sequence "a2a2a2a2a2" or a Fibonacci sequence "aa2aa2aaa2aaaa2aaaaaaaa2 . . . " or any other operator. The daughter stream 208 can now be further modified by the third beacon stream 102A-3. In the simple sequence the daughter can be "a2?a2?a2?a2? . . . " or even time shifting the third stream 102A-3 "aa2aa2aaa2aaaa2?aaaaaaaa2? . . . "

Figure 7:
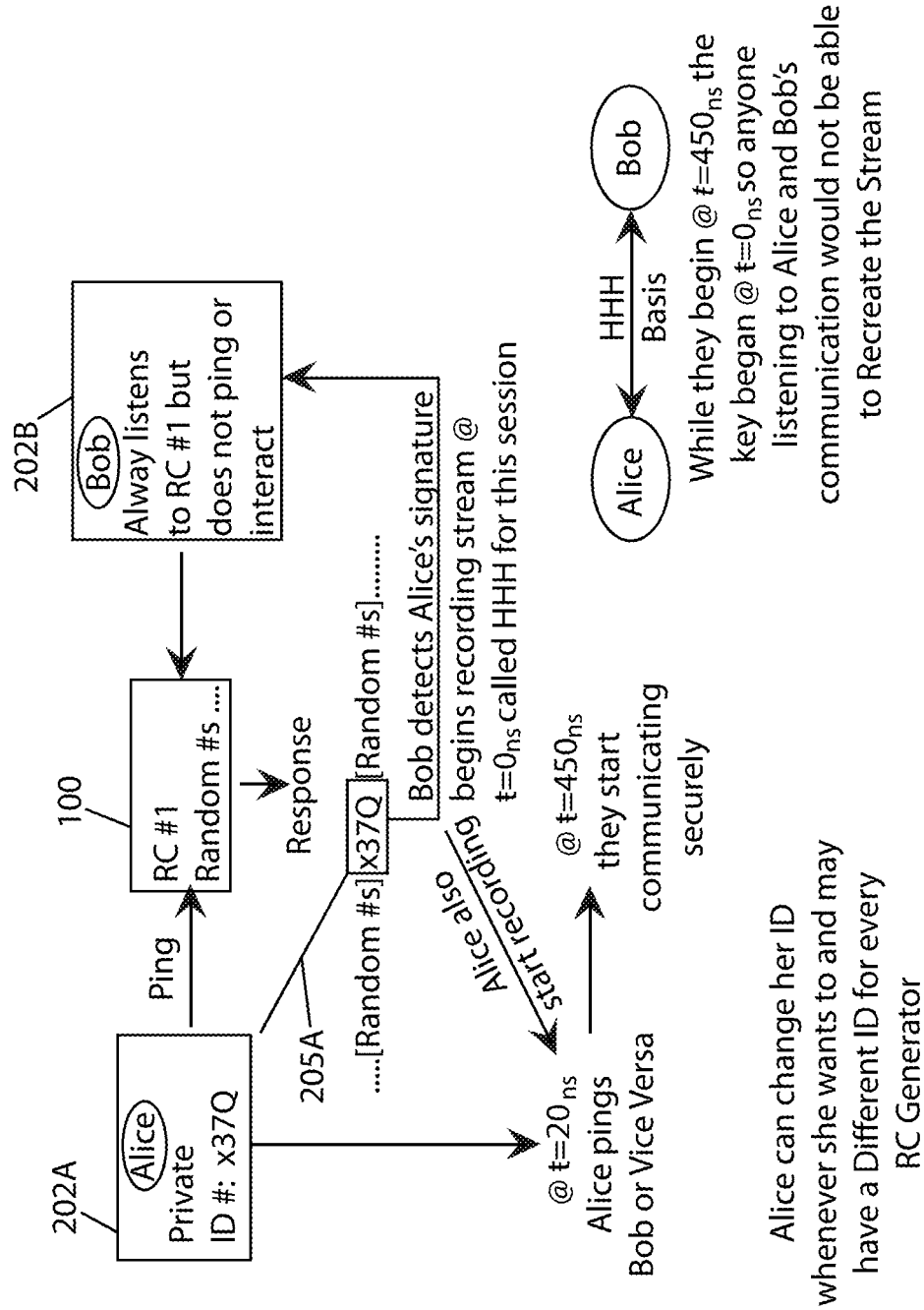
FIG. 7 is a diagram illustrating a calling example of the present invention.

Before turning to an example of using CE to encrypt a message between Alice and Bob, another example of a feature, known as "calling" is illustrated in FIG. 7. Calling allows for the insertion of user's unique sequence 205 into the normal RC stream 102. While the user sequence 205 can be unique and nonrandom, it should have all the characteristics of a random sequence to avoid diminishing the entropy of the pure RC stream. One example is a user's unique hash, which is largely indistinguishable from any random stream of numbers along with a time signature, is inserted into a live RC broadcast stream 102 and detectable to potential recipients knowledgeable of the hash. The user sequence 205 can be detectible to any other users knowledgeable of its existence and monitoring the RC stream.

The user sequence 205 may be used as a signal initiating communications with other participants to begin a secure exchange or session. Similar signals may be generated by multiple users simultaneously to create a multi-party identifier, also initiating a secure session or communiqué.

Turning to FIG. 7, Alice 202A and Bob 202B have established a protocol in which Bob 202B can monitor the stream 102 of resonator 100 to await Alice's user sequence 205A to know that Alice is sending a message and to start key generation. Here, Alice 202A inserts her user sequence 205a "x37Q" into the stream 102. Bob, who doesn't normally interact with the resonator, but just monitors the stream 102, notices the user sequence 205A and begins a predetermined key generation algorithm.

Simple hashes may be used and combined with time dependent signatures so the same identifier number sequence is never seen again in the RC stream, but authorized users may always be able to detect its unique value. This can signal an individual or group that a user is attempting to call or make contact or deliver a message. Combinations of hashes may also be used in the same way across multiple streams in complex combinations to achieve the same affect while further obfuscating the communicators and perturbing the normal operation of the resonator 100.

Crypto signaling may be the basis for using the resonator 100 as a carrier signal for a communications network to ring or ping users. The combination of pings from multiple resonators 100 may, for example, be the alert message for using a specific set or resonators 100 to communicate. The user sequence 205 and their subsequent communications may overlap or operate independently—a set of resonators 100 may only be used to "ring" the intended contact while a different system may carry the actual data transfer or communications.

This construction is not limited to being used for identification and calling. It may also be used to broadcast an alert message to an individual or group of authorized users. This is tantamount to using the RC stream 102 for inserting steganography instead of establishing contact, but it uses a near identical mechanism.

Turning back to an example of CE to encrypt a message between Alice and Bob, to begin, both have their own user sequence 205. Examples for their user sequences 205 can be a large number, a large number related to a hash of their email address, or any other digit sequence. The user sequence 205, in examples, is long and/or random enough that it is indistinguishable from any other random number sequence. Again they want to exchange encrypted messages 106 at 0100Zulu. Alice communicates with the resonator 100 and has her user sequence 205A inserted into the stream 102. Bob knows Alice's user sequence 205A and takes its appearance in the daughter stream 208 as a sign from Alice to start recording the stream 102. Bob returns in kind by inserting his user sequence 205B into the stream 102 for Alice to identify and to start the encryption scheme they devised.

In this example, the stream 102 is "1111111111111111", Alice's user sequence is "3333" and Bob's user sequence is "7777". Further, their agreed upon sequence to start using the stream is "956888". To anyone monitoring the communications, all they see is "111111111333395688811111111111177779568881111111 1111 . . ." Note that in reality these are long non-repeating random numbers, but are just simplified for this example. No one should be able to guess that "3333" is Alice's user sequence, and Bob only knows it because he knows her, the reverse is true for Bob's user sequence. To any outside observer these are just more random numbers in the stream. "956888" may be an agreed upon instructions from as easy as "start recording" to "use every $7^{th}$ digit to create the encryption scheme and insert the encrypted message back into the stream."

In other examples, Alice and/or Bob can also have their user resonator 206 insert more random digits into the main stream 102 to further confuse and entangle their communications. This allows Alice and Bob to communicate indirectly via perturbation of the resonator 100. All of the above looks like a stream of just random numbers to an outside observer, all the while it provides Alice and Bob the ability to easily encrypt and decrypt information with very little computational power.

Given the above, below is one example of actually encrypting a message using CE. Alice and Bob agree to only use one independent resonator 100 and each entangle with it by inserting their own user stream 204 and the resulting daughter stream 208 is used to encrypt messages. Alice and Bob start by identifying themselves to the resonator and each other. Alice's user sequence 205 is "6325" and Bob's user sequence 202 is "7458." Alice's user resonator 206 generates a user stream 204 of repeating "1234" while Bob's generates a repeating sequence of "5678". The resonator 100, at the agreed upon time 0100 Zulu, transmits 4 random digits of "8542". Alice's message to Bob is "9999" but since Alice and Bob have affected the stream 104 to create a daughter stream 208 both are used to encrypt the sequence.

So, at 0100+1 Zulu, the two user sequences and the stream are coupled to first identify the parties and start the creation of the key. In this example, by false addition:

| |
|---|
| 6325 (Alice's user sequence) |
| 7458 (Bob's user sequence) |
| 8542+ (resonator's random numbers) |
| 1215 |

And thus "1215" is transmitted at 0100+1 Zulu. Again, this looks like just another random section of the stream, but since both Alice and Bob know their own and each other's user sequences, and read the stream digits, they know that it's time to start creating the key to encrypt the message.

At time 0100+2 Zulu, the stream from the resonator is now a daughter stream 208 to Alice and Bob (to the rest of the world, they only see it as the stream). The resonator 100 generates the next 4 random numbers "1182" and that is entangled with the two user streams, as below:

| |
|---|
| 1234 (Alice's user stream) |
| 5678 (Bob's user stream) |
| 1182+ (resonator's random numbers) |
| 7084 |

The sequence "7084" is now the key 104 used to encrypt and decrypt Alice's message of "9999":

| |
|---|
| 9999 |
| 7048+ |
| 6937 |

The encrypted message 106 of "6937" can be transmitted in the clear to Bob without worry of it being compromised. However, it can just as easily be decrypted by Bob, since he simultaneously generated his symmetric key at the same time Alice generated hers.

Alice and Bob know they have coupled their user resonators 206 to the available resonator 100 because of the first user sequence signal that changed the stream to identify that a new key should be generated and a message is forthcoming. Once the initial information between Alice and Bob has been exchanged, and note that the key has not been exchanged, all both parties need to do is monitor the agreed upon stream(s) to know when to generate a new key and that a message is being communicated. Also note that now, each back-and-forth between Alice and Bob can be encrypted using a different key, generated on-the-fly. Even if an attacker could get any one of the keys, it is only good for the message at hand.

In other examples, Alice and Bob can actually verify the independence of and that they are truly coupled to the resonator 100 by sending a validating signal 210, which in one example can just be the false sum of their user streams 204 and compare it to the stream 102. Either can send the validating signal 210 independent and apart from the other. If the resonator 100 is compromised, one or both will see a non-random signal when they reconstruct the actual stream 102. Alice and/or Bob can also further obfuscate their communications by sending out a series of just validating signals 210 (random digits) before sending their user sequence 205. This can confuse a hacker just looking for a connection to the resonator as the trigger for key generation.

Figure 8:
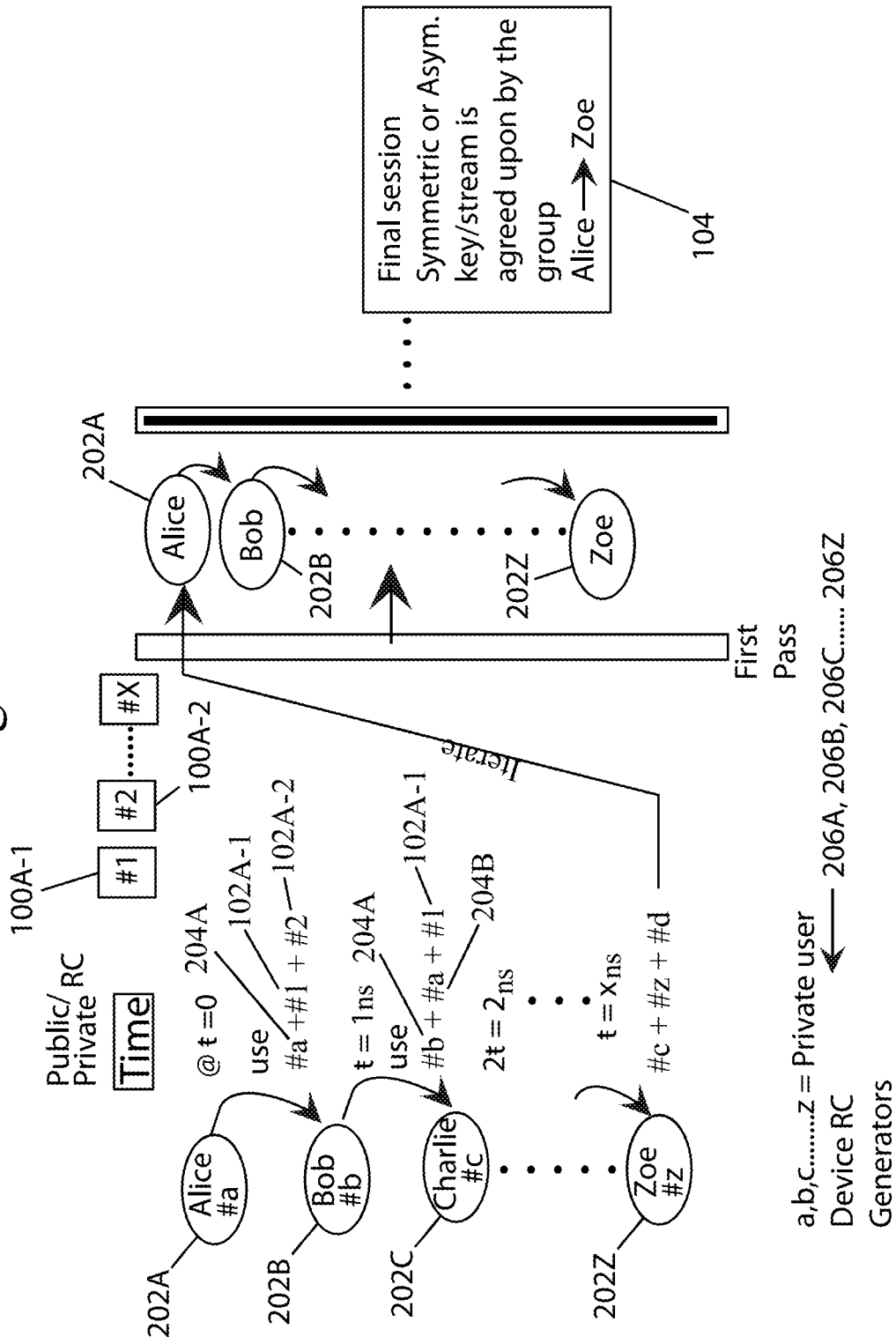
FIG. 8 is a diagram illustrating a cascading example of the present invention.

Building on the previous examples, FIG. 8 illustrates yet another RC example. This feature, known as Crypto Connection Cascading, is a group crypto property where mutual connections are established between trusted users wishing to communicate. A unique sequence of steps among users 200 may be created to exchange small pieces of low encryption data to snowball into a strong encryption resonant state.

In a simple example, a circular model may be used where the first member of a group, Alice 202A announces two beacon resonators 100A-1, 100A-2 can be used to encrypt the communications for the group. Alice 202A contacts Bob 202B by combing her own user stream 204A with the two public streams 102A-1, 102A-2. Bob 202B responds to Alice 202A by adding his own user stream 204B to validate this new channel but he also transmits new instructions to Charlie 202C on how to combine the public streams 102A-1, 102A-2 for the group. This process is iterated among all the users of the group (illustrated until Zoe 202Z) until everyone's user stream 204 generated by each of their personal generators 206 is incorporated with the public streams 102A-1, 102A-2 and all users (Alice to Zoe).

Cascades of resonators 100 may also be established independent of users 200 to create perturbations within the network 300. This may be used to seed new streams of resonators 100 or alter the state of any networked connected group of resonators 100. This can be used as an additional security measure to reduce the impact of any number of compromised elements within the networked group.

Figure 9:
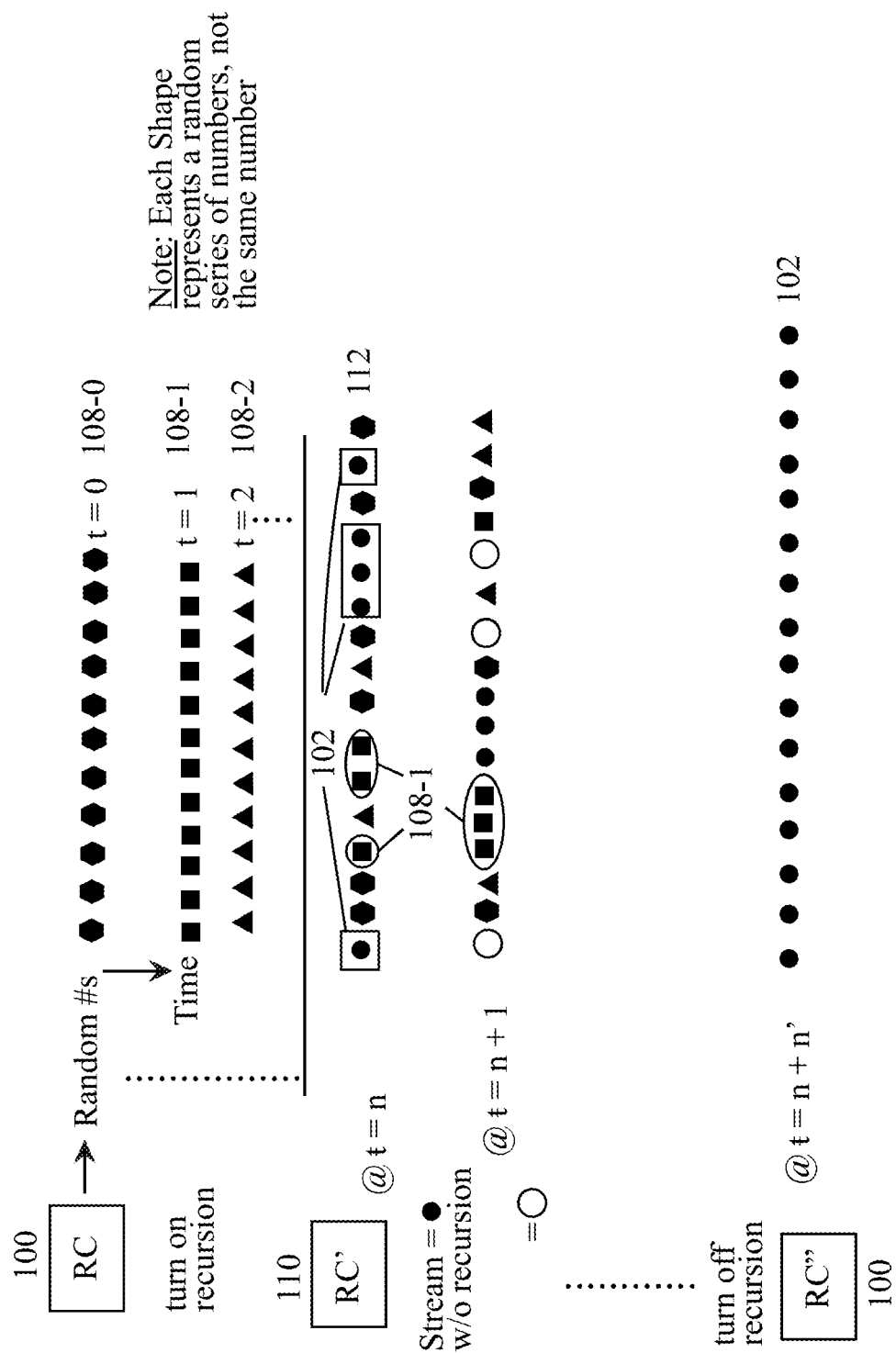
FIG. 9 is a diagram illustrating a recursive cryptography example of the present invention.

Issues with the any of the crypto-resonators 100A, 100B, 100C, etc. can be that one or more of the resonators 100 are either deliberately or by lack of design not "random" enough. FIG. 9 illustrates an example of Recursive Cryptography. Recursion combines current/future streams 102 with previous streams 108 by inserting previous streams 108 in a randomized way into the live stream 102. Examples can be achieved in any number of ways over time and distance from the current live stream 102 back to the historical stream 108. The insertion of this historical stream 108 into the live stream 102 can be done in real time or achieved through random interspersion of the historical stream 108 into the live stream 102. This complicates and randomizes the recursive stream 112 from the recursive generator 110 when, for example, the pseudo number generator is weak and possibly flawed. Some chipsets and algorithms have been observed to suffer from this defect, which may be mitigated to some extent by using recursion, ideally from multiple resonators 100 within a network 300. Crypto recursion may also be used to re-transmit the same signal over and over again while appearing different to the unauthorized user. This may be useful in situations where a crypto signal does not "ping" the target user, as in the calling example above, because their device is off or temporarily dysfunctional. The recurrent signal is still present until detected by the target user but is otherwise obfuscated and apparently a normal evolving random number sequence from the recursive resonator 111.

Figure 10:
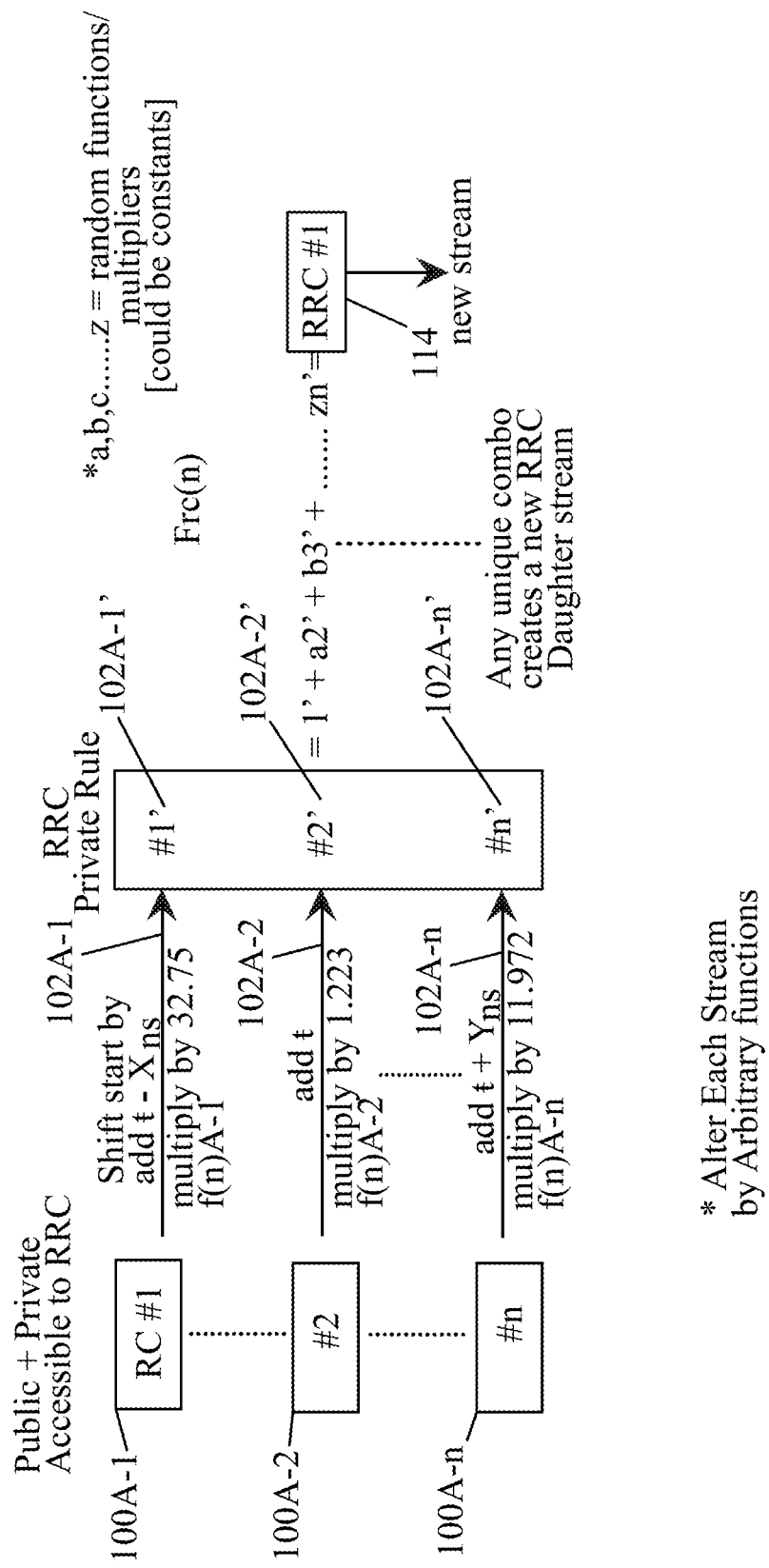
FIG. 10 is a diagram illustrating a recombinant cryptography example of the present invention.

Another example of a technique to mitigate defective or possibly compromised resonators 100 can be Recombinant Cryptography. Examples combine multiple streams 102 from multiple resonators 100 into a new a new and unique stream recombinant stream 114. This can diffuse any prior non-random elements over time. FIG. 10 illustrates one example of forming a recombinant stream 114. Public streams 102A-1, 102A-2 . . . 102A-n from beacon resonators 100A-1, 100A-2 . . . 100A-n are collected, let say by a server and performs one or unique functions f(n)A-1, f(n)A-2 . . . f(n)A-n, which are in the illustrated example to multiply the first stream 102A-1 by 32.75, multiply the second stream 102A-2 by 1.223 and multiply the $n^{th}$ stream 102A-n by 11,972. This forms modified streams 102A-1', 102A-2' . . . 102A-n' which are then combined using a recombinant function $F_{rc}(n)$ to then broadcast a recombinant stream 114, for example through a radio resonator 100B. In this example, the recombinant function $F_{rc}(n)$ is a sum of each of the modified streams, which each stream again being multiplied by a function. Any of the functions f(n)A-1, f(n)A-2 . . . f(n)A-n, $F_{rc}(n)$ can be as simple as a integer constant applied using a basic mathematical functions (addition, subtraction, multiplication, division, exponent, factorial, etc.) or complex algebraic calculations with complex or irrational numbers.

In a real world comparison, Recombinant Cryptography is akin to combining multiple similar gases into a large gas chamber, thus mixing the product gas and making it more difficult to identify the individual components. Other examples can merge Recombinant Cryptography with Recursive Cryptography, and this can effectively remove any non-random streams. This is analogous to combining two gases of varying volumes and creating a completely new type of molecular gas, while leaving some of the original gases unmixed to further complicate the mixture. This creates a type of computing problem which is not unlike doing generalized mass spectroscopy on an idealized gas—without great computing resources and effort, it is difficult to identify and deconstruct the components of this type of gas, which is not in equilibrium, not homogeneous, not in homeostasis relative to the feedstock of new crypto streams. It is also fundamentally more complex than basic spectroscopy because this system is like having an inexhaustible number new elements and molecules, many of which will only be seen once and never again. Therefore, it is resistant to characterization and pattern/frequency analysis because it is dynamic and evolves over time.

Figure 11:
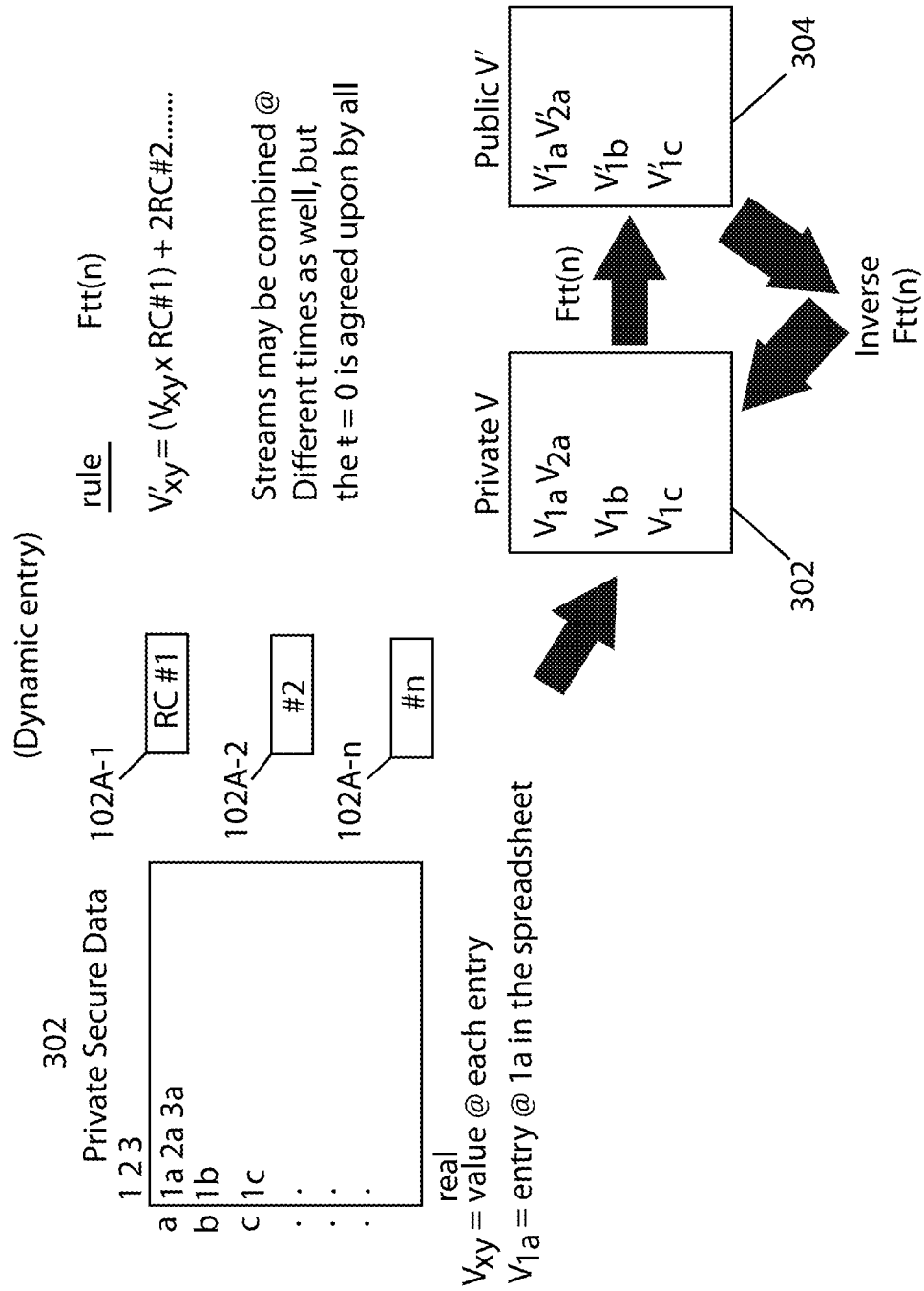
FIG. 11 is a diagram illustrating a time travel cryptography example of the present invention.

Another variant example to combine or modify resonator 100 streams 102 is Time Travel Cryptography. This example, illustrated in FIG. 11, can be a continuous re-encryption scheme where any live data set is constantly recycled through any combination of crypto-resonators 100. For example, a private data spreadsheet 302 can be placed on-line and made available through a public facing website, thus public data spreadsheet 304. One or more of the data entries $V_{xy}$ (where x and y are the row and column of the value, respectively) can be encrypted using time travel crypto and the encrypted data entries continuously change on a cycle or schedule—individually or in aggregate. As illustrated, the function $F_{tt}(n)$ dictates the encrypted value of each data entry. The encrypted value can change with each passing digit in the streams 102 or be re-encrypted on some static or rolling time table (hence "time travel"). Further, each data entry V, can be encrypted using a different simple or complex function.

Thus, the data entries $V_{xy}$ flow through time as ever changing encrypted data entries $V_{xy}'$ as the data evolves with any crypto stream. It also insulates the live public data from any past compromise of a crypto stream controlled or broken by a nefarious actor. This model would force anyone attempting to decode a live stream to record all the changing data for a long period of time while also doing so for all the suspected live resonant crypto streams supporting the encryption of this data. It exhausts enemy resources while making it easy for authorized users to access the same data in public. It can also be modified quickly on the fly.

A yet further example of the invention involves introducing a non-random string of digits, a "ghost" stream 212, generated by a ghost resonator 114, into a resonator stream 102 to form a ghost embedded stream(s) 116. The user 200 does not need to mathematically manipulate the ghost embedded stream(s) 116, the ghost stream 212 itself is the communication. To read the ghost stream 212 a user can have a "ghost" filter 214 to extract the ghost stream 112 from the ghost embedded stream(s) 116 and read the message.

The ghost stream 112 may be introduced to any resonator stream 102 by embedding seemingly random information into the stream(s) 102 from a ghost resonator 114. The ghost stream 212 may be recognized and used by authorized users 200 using the ghost filter 214 to view or capture it. The ghost stream 212 uses the resonator stream 102 to form the ghost embedded stream 116 to act as a carrier signal for a parallel flow of information that on the surface appears identical to a regular resonator stream 102.

FIG. 12A illustrates the above and an example of a communication between Alice and Bob 202A, 202B. Alice 202A wants to send Bob 202B a message, and inputs that message into her ghost resonator 114. The ghost resonator 114 then inserts parts of the message into a plaintext message. This can be a static message (now acting like an encoded message 106) or, for example, inserted into one or more resonator streams 102 to form one or more ghost embedded streams 116. Bob 202B, downloads the message 106 or records the streams 116, applies the filter 214 and reads the text.

Figure 12B:
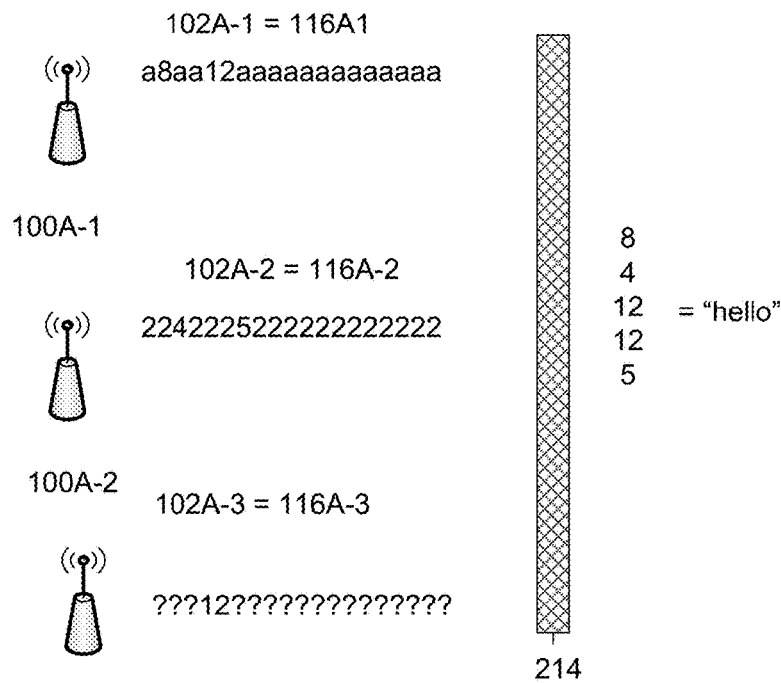

FIG. 12B illustrates another example. Returning to the above, Alice 202A wants to send Bob 202B the message "hello", which when converted into numbers by position in the alphabet is 8-4-12-12-15. Alice's ghost resonator 114 begins the task of communicating with three beacon resonators 100A-1, 100A-2, 100A-3 and inserting the ghost stream 212 (which is in this example, 8412125) into their multiple streams 102A-1, 102A-2, 102A-3 to form multiple ghost embedded streams 116A-1, 116A-2, 116A-3. Bob 202B applies the ghost filter 214, extracts the ghost stream 212 from the ghost embedded streams 116A-1, 116A-2, 116A-3 and receives Alice's "hello."

Ghost cryptography is distinguishable from entangled cryptography above, since in one example, the message is sent in the clear, just divided into very small pieces and sent piecemeal through one or more streams and hidden therein. In a paper-and-pen example, using "hello", the previous forms of cryptography exchange one letter for another and one must know the key to decrypt the message. As from above, Alice can write down on a piece of paper "imsmu" (which is 9-13-19-13-21 converted back to text) and hand it to Bob. Only Bob knows the message since he is the only one with the key. Anyone intercepting the message knows it encrypted. Ghost cryptography acts differently, Alice, instead of sending Bob "imsmu" writes Bob a note:

"Height OK, everything on schedule, well is dry, and we are out of ink." To all observers, this is a plain text communication, however, Bob applies a filter, which in paper-and-pen can be as simple as an overlay with the letter position noted, and can filter out "Height OK, everything on schedule, well is dry, and we are out of ink."

While highlighting the difference in paper-and-ink, using the resonant streams 102 is much more powerful. In the stream example, Alice actually sent Bob three simultaneous "notes" (one from each beacon 102) and Bob extracted the message from all three. Note that any number of beacons could be chosen.

To increase the cryptographic strength of any of the previous examples, multiple examples can be layered on top of each other. For example, once a message is encrypted it can then also be ghosted. A protocol can be developed where informing a counterpart of an incoming message happens using streams from one set of resonators, the encryption key is created on the fly using a second independent or partially independent set of resonator streams, and the encrypted message is ghosted through a third set of resonators. Using modern computing to develop that protocol is relatively straight forward, however very few to no nefarious actors have the resources to crack such a coding protocol.

Another feature of the present invention is Checkpoint Cryptography. A local geofence network 302 of resonators 100 can be arranged to be isolated from other public or private resonators 100A, 100B, 100C or their networks to be used as a cryptographic perimeter for users in a geofenced space. Geofence, in broad terms herein, can be a physical or logical demarcation around a group of users. A narrower definition is a virtual barrier around a physical geographic area used for administrative purposes. Herein the definition is extended to include barriers over a virtual domain, such as a logical pool of connected users who may be geographically dispersed globally, but have access to the same geofence network 302.

In one example, a series of local crypto resonators 100D are ideally disconnected from any communications network 300 tantamount to a LAN. These local crypto resonators 100D can form a geofence area 304 used to geofence a group of users 200 and secure their localized network communications. If a user's physical or logical proximity to the local crypto resonators 100D extends beyond the limits of the geofence area 304, in an example, go beyond the signal range of the local crypto resonators 100D, the users 200 effectively lose access to the encrypted communications of the group. Examples allow geofence areas 304 to overlap to create complex workspaces of access to authorized users.

FIG. 13 illustrates some examples of checkpoint cryptography. In this example, there are two geofence areas 304, geofence area alpha 304A and geofence area beta 304B. Users 200-1, 200-2, 200-3 and 200-4 are inside geofence area alpha 304A based on their proximity to local crypto resonator alpha 100D-1. Users 200 inside geofence area alpha 304A are permitted to only access server alpha 10A. In this example, server alpha 10A is not connected to any external networks 300, i.e. the internet (a.k.a. "air gapped"), but only the geofence network 302.

Elsewhere, users 200-11, 200-12, 200-13 and 200-14 are inside geofence area beta 304B based on their proximity to local crypto resonator alpha 100D-1 and local crypto resonator beta 100D-2. The users 200-11, 200-12, 200-13, 200-14 are permitted to only access server beta 10B. Note that the users cannot receive local crypto resonator alpha's 100D-1 signal, which exclude them from geofence area alpha 304A. Both sets of users 200-1, 200-2, 200-3, 200-4, 200-11, 200-12, 200-13, 200-14 are allowed to access the data hub 12.

Note that users 200-3, 200-4, 200-12, and 200-14, while inside their respective geofence areas 304A, 304B, they do not have internet connections. In this example, external network 300 connections do not affect whether a user 200 is or is not "inside" the geofence areas 304A, 304B. Other examples may take a user's external network connections into account as part of the requirements for being in a geofenced area 304. For example, in geofence area alpha 304A, since server alpha 10A is air gapped, the fact that users 200-1 and 200-2 are connected to the internet (or any other non-secure network 300) may disqualify them from accessing server alpha 10A, thus cutting them out of geofence area alpha 304A, even though they can receive the stream 102 from local crypto resonator alpha 100D-1.

Note that just the physical act of "receiving" the stream 102 from the local crypto resonator 100D is not the sine qua non of being in the geofence area 304. The resonator streams 102 are still be used to create cipher text and cryptographic keys 104. Without access to the particular stream of the local crypto resonator 100D (and the information on how to use it), an "outside" user does not have access to, in essence, the OTP being used to secure the data in the geofenced area 304. Thus, any users 200 in proximity to the local crypto resonator 100D can send and receive cipher text which they can decrypt inside this geofence/cryptofence. The border of the cryptofence acts as a checkpoint (hence the name) where signal loss to the local crypto resonator 100D equals losing the ability to decrypt ciphertext—even if the ciphertext is somehow available.

Examples requiring physical proximity can be trivial to implement in WiFi networks because the signal's non-zero travel time may be used to establish coherence. Distant users 200 may experience latency even in a non-repeater network. The coherent addition of multiple signals within the geofence area 304 is easily achieved because the signal timing is identical for some defined physical distance from the constellation of local crypto resonators 100D. Further points or those capturing the signal from a repeater cannot recreate the correlation of the combination of signals inside the geofence.

Additional geometries may be achieved for logical geofences where time signatures are included in the local crypto resonators 100D signal within this framework. In this example, physical proximity is not an issue because timing can be synchronized electronically after a buffered signal is established and captured within the group of geofenced users.

Given the various examples of cryptographic schemes outlined above, they lead to a whole host of other cryptographic solutions and configurations and one such solution is Amber Cryptography. This solution allows any static encrypted data at rest and the accompanying decryption key to be stored separately and made available to trusted users in the future. The solution can be effectively a snapshot in time of a fixed amount of encrypted data which does not evolve or change over time. The data can be stored in the public domain because the exact resonant crypto stream 102 used to create it was destroyed in the past and only preserved by trusted users 200. Only these users can read the data stored in this amber-like state.

Figure 14:
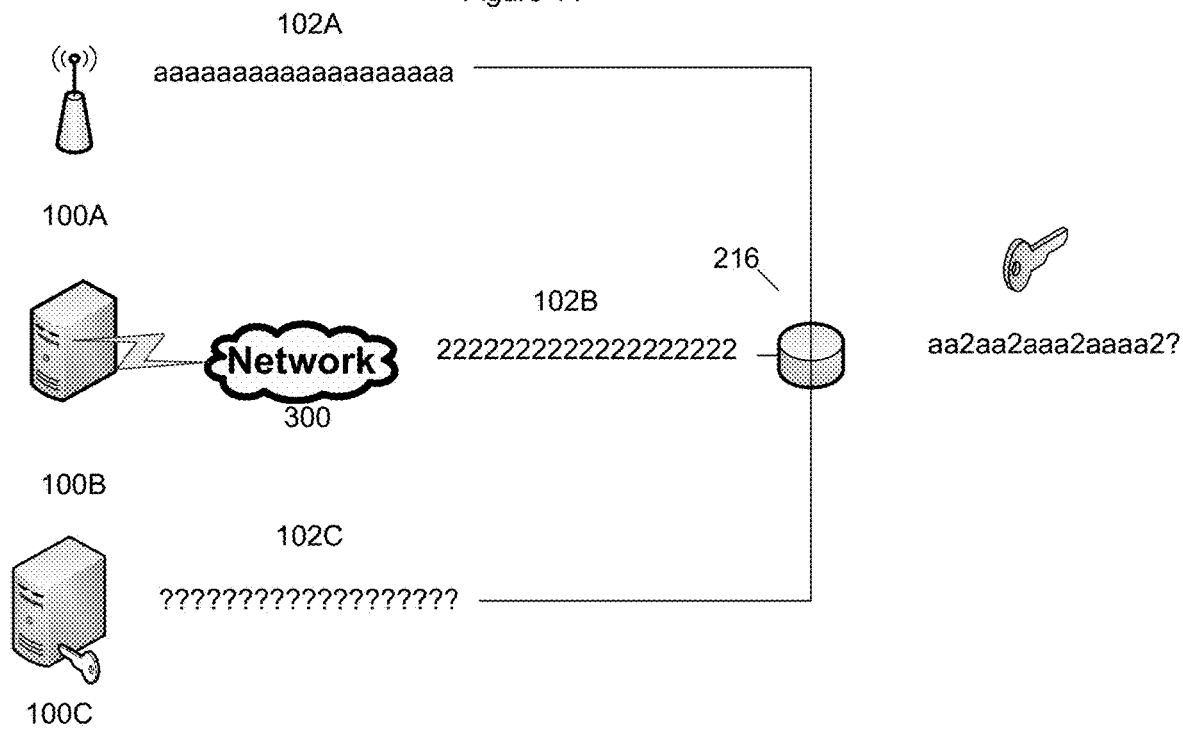
FIG. 14 is a diagram illustrating an amber cryptographic example of the present invention.

FIG. 14 illustrates that amber storage 216 can record at a particular time one or more streams 102A, 102B, 102C of one or more crypto-resonators 100A, 100B, 100C. In an example, the time can be chosen as the time the data was encrypted. These stream segments can be stored as the raw segment, a daughter stream 208 segment or the key itself. When stored as the raw stream or daughter stream, different cryptographic algorithms can be applied to the stored streams, allowing one amber storage 216 to service multiple sets of encrypted data without each set sharing the same key. The amber storage can be any non-transient memory, including any form or magnetic or solid state memory, magnetic tape, optical storage, etc. Amber storage 216 can be one or more storage devices owner by one or more users. In the multiple "key" situation, it may not be the key, but the amber archived streams that are required. In FIG. 14, an example can be that a separate user stores each of the separate streams, but the encryption algorithm used all three streams to encrypt the data. No one user now has enough of the streams to decrypt the data alone. The user does not have the key, per se, but a portion of the data required to generate the key. This is important, because even if a nefarious actor was able to collect all of the streams needed, she still does not have the key, the encryption algorithm still needs to be known. Thus, for additional security only a $4^{th}$ user may have the algorithm.

The amber cryptographic solution is not unlike posting a large encrypted file in the public domain where anyone can download it but only those with the key can open it. In one example, the "key" is the unique resonator stream combination which does not repeat, but may be distributed at any time by those who captured it. The key 104 may also be a combination of multiple keys held by different users to create a single master key—this is akin to creating a safe requiring several keys operating in unison to open it. These keys 104 may be held by numerous trusted users, all of whom are required to agree to decrypt the data at the same time.

Expanding on the example above, the combination of RC networks and individual resonators 100 can form a Crypto Manifold. Globally, the largest structures are the crypto-manifolds (CM), which may connect to form a crypto superspace. Each crypto-manifold is locally defined as collection of resonators 100 and connected networks which may be linked to other resonators or networks to form a discrete virtual surface. The surface may have an arbitrary number of effective dimensions n, analogous to the dimension of any manifold. Each connection is a potential access point to stream OTPs. Points on the crypto-manifold are not limited by physical proximity. For example, a single crypto manifold may be the linked collection of orbiting satellite based resonators 100 connected to terrestrial and submarine resonators 100, streaming from both hardware and software platforms. A second similar manifold with parallel structures may lie adjacent to the first, but have only points of intersection or overlap via direct satellite connections and communications. While no internal points between the two crypto manifolds can be reached by any one user, they may still exchange information and resonate by the points of intersection.

CMs may assume the mathematical framework of any manifold, only limited by the topological requirements of the network they create—virtual or physical. The collection of CMs creating a cryptographic network may be fractal, hierarchical or chaotic over time. CMs may arise naturally or by design to serve the cryptographic needs of the community of devices they serve. Thus, the largest starting CMs may become subsumed by daughter manifolds and eventually replaced by them to become new CMs themselves. A hierarchy of CMs may become fractal or spawn a new chaotic network, possibly independent of the point of origin. The important point is that CMs are capable of supporting multiply connected graphs of any dimensionality. As such, on the largest to the smallest scales, CMs cover all possible manifestations of an RC system. Again, these are communications by any means, not simply IP-based networks or their digital variants. For example, RC generated signals may be created use phase or quadrature modulation, differential encoding and other schemes to transmit data of any type.

Also available, using examples of the present invention, is Crypto Symmetry Breaking. This allows users 200 to communicate with each other securely and any intruder wanting to "listen in" on the conversation. In this context, the symmetric crypto state of a dynamic system of resonators 100 and users 200 is one in which no devices are initially linked or "coupled" to each other. Here, dynamic means the resonators 100 and users 200 have the ability to interact with each other. Meaning, users 200 are not simply passively listening to the resonator streams 102 and using them. They use their own personal streams 204 to alter the state of the public streams 102 and those belonging to other users 200, as noted in the examples above.

In this system and for simplicity, all devices have access to all streams 102 and other devices and may choose to connect or not. (Of course, this does not have to be the case and any more general combination is equally acceptable.) The broken symmetry state is when any group of users decides to connect to each other and couple to any number of resonators 100 to begin communicating securely. The crypto network of all possible mixtures of this system has collapsed into one specific configuration for this secure session. This includes the dynamic algorithm to be used for the session. Each additional user wishing to join, the secure network must disrupt it to become visible and begin communicating. This disruption changes the configuration of the communications to a new broken symmetry state, essentially alerting all members of the new user's presence and availability to participate in a secure exchange. It also prevents eavesdropping because no one can collect the clear text communications without participating in the encryption used to secure them.

This property is important for two reasons, one of which is the foundation for quantum communications. Secure communicators would know instantly when any part of the decrypted signal becomes available to a new user—there is no way to passively capture the unencrypted signal otherwise. To see/hear/read anything requires coupling to the system in a detectable way, thus perturbing it into a new "broken symmetry" state. Second, both the symmetric and broken states may be used for authentication and validation of any secure network, prior to transmitting any information. If the group of users cannot all couple to each other and the selected resonators 100 they are not authorized or mutually trusted users. If somehow a bad actor attempted to force himself into the group at any time, it would destabilize the broken symmetry and no one would be able to see anything. The communications go dark and the group initializes a new secure session excluding the attempted point of entry, such as a hacked resonator 100 or user device 103.

Note that the examples above can collapse into one or more crypto concepts like Crypto Convergence. This is as the examples show above in a very public resonator network (e.g. beacons 100A and/or radio 100B resonators) with no access to private resonator (e.g. radio 100B and/or secure 100C resonators), a group of users may share access to multiple public streams 102A and their own device generated streams 204 to create a unique temporary private stream built on the trust of their own devices—they may even want to publish their own identities or otherwise vouch for their trustworthiness. This can be done in software on any one device within the group or in a sandboxed cloud environment. This converged stream has multiple uses beyond securing the entire group and overcoming any distrust of the public resonators 100A, 100B (for example if they were hacked and compromised with non-random digits). Subgroups of users 200 may be established by subtracting any one users' stream from the converged stream, possibly using a different algorithm as well. This is like having a new community resource by creating a virtual meeting space to access crypto. It is the basis for creating a larger structure or network of similar convergence points which may form a lattice or phase space—this can be done even if every primary resonator 100 is bad. This virtual environment is a way to capture all the possible states of the convergence points and use them as a dynamic distributed encryption system.

Any trajectory through the points of this lattice is like choosing a streaming encryption key to connect users or to open a secure communications channel. It avoids the failure of any part of the system or say an entire country or geographic region of resonators 100 go down. Trusted crypto schemes can be created beyond RC by using a distributed network of secondary virtual appliances, some or all of which may be effectively notarized by groups of users. For example, a certificate authority for SSL may be created for normal IP security without having a centralized service to do so. Unlike the block chains in use for bitcoin, there is no permanent record of the transactions and signatures used by anyone nor do the same convergence points need to exist over time. They can be spun up and down as needed on-demand. Users are not locked into using any one or combination of points and may lose trust in some. The point is they are not permanent fixtures and there is no single point of trust, including within the RC model.

The examples of the present invention can also result in a Crypto-hierarchy. This property of RC allows many users 200 of the same set of data to have varying degrees of privileges. While the CEO (or C-suite) of a company may be given access to everything, under this cryptosystem, lower level employees may be allowed lesser accesses within the same cryptographic framework. This is important because it does not change the cryptographic strength of the system nor does it require additional computing resources to implement. All or some of the RC elements of the same system may be used to create a tiered level of access or any complex model issuing rights to data. By changing the access to resonators 100 (e.g. geofencing) and/or altering the algorithm used to encrypt data with them, any customized system of privileges can be established on the same data set without creating multiple sets of encrypted data. Each user has an effective cryptographic filter by which they may view the overall data set, restricting their visibility on a need to know basis.

Once an RC system is adopted, one issue is its use by nefarious actors. Perfect encryption allows these actors to send secure communications as well. The same security protecting "good" information also prevents law enforcement from cracking the communications for "bad" information. However, this is not necessarily true, there are any number of widely used techniques for law enforcement to tap into the nefarious actor's system. If an authorized agency has physical access to the nefarious actor's device, the above protocols can be discovered and law enforcement can have full access to the communications. If the same agency can simultaneously access all the same streams, including private streams, and they gain access to the algorithm used to combine them, they can see all the communications in the clear. This currently happens when simple and/or poor algorithms are used—an agency can quickly sift through the small key-space generated to decrypt the communications—without knowing in advance anything about the algorithm. It's an unsophisticated brute force attack on a bad security system designed to keep out regular hackers and good guys.

On the pillars of RC, information can be transmitted as lightly encrypted metadata with a single string defining each parameter—a simple SHA-2 hash can achieve this. An example string may look like:

[time/date signature in GMT][personal identifier][resonators list to be used][session combination of resonators to be used][additional security instructions set} [etc. . . . ]

Each party in the communications may exchange and compare the instructions or one party may do so, but each exchange should use the same hash function to verify authenticity. These are inherently very strongly collision resistant because the first block will never repeat and the session combination can be a very complex function. These are time and space dependent variables unlike the effectively static keys used today in PKI.

In addressing other potential flaws of RC, a bad actor can create and deploy their own resonators, but there is no assurance that users will use their resonators, or just their resonators when encrypting a message. Further, in reviewing the use of creating daughter streams and combining streams with resonator streams one potential flaw may be that a bad actor floods one or more resonators with a large portion of 7C (or e, etc.). The number is non-repeating, pseudo-random, infinite, but their values are documented to a trillion digits. This is not truly an option since a bad actor cannot "flood" an existing resonator. The resonator is still generating its own stream.

A hacker may be able to compromise the hardware/software of the resonator but they cannot create a fake stream and trick people into using it—unless they've hacked into the trusted devices. "Spoofing" a resonator is analogous to spoofing a router, and this is a different compromise of the network, not the strength of the RC system. As an example, resonators can use a similar IP naming convention like routers. Criminals can deploy and name their bad resonators to look like a valid resonator, but for banking and similar purposes, there would be a white list of resonators. Note that the power of RC is that anyone using any number of bad resonators can still defeat the criminals' hacking just by using a single valid resonator in their algorithm. Meaning, if a user encrypts using bad resonator streams 1-9 but used a secure algorithm to generate valid stream 10, the communications are still secure. Furthermore, even if all streams 1-10 were bad and not truly random, a well-designed algorithm still produces strong encryption.

Thus, secure communications are still possible in a completely compromised environment using this technique. Beyond having a strong identification key, each user may have a unique algorithm as well—these are trivial complex functions to generate and there is an infinite variety of them. It is akin to every user getting their own unique key, and their own unique lockset—their key-type only fits into their lock-type and no two users have the same combination.

Back-calculation is also not feasible. Cryptanalysis works best with large structured data sets repeatedly using the same key in block ciphers, for example. This works because the letters "s" and "a" are more common in plaintext than "q" and "z"—probability tables are well studied for all languages. Even this information is not useful here because a user never re-use the same key. It is a far more difficult computation problem to now take all the resonator streams producing varying length keys, compare those to all the varying length cyphertext and hope to do the same cryptanalysis. The difficulty grows exponentially when using numbers (say for banking transactions) where the distribution of numbers is largely equally spread across 0-9. The problem is the same as above, near perfect information is required about the entire system from the resonator to the end-user algorithm. Nothing short of everything leads to any plaintext.

Turning to banking and POS transactions, although many may use 100% publicly available resonator streams, some of these can be proximity devices—they only transmit to within 20 feet of a cash register, for example and they are not connected to the internet. Other subscription based systems for applications are very easy to deploy and validate through existing technologies—RC may just be an extra layer of very strong encryption for very little cost in energy and compute resources. Either way, the mechanics of individual applications is fairly straightforward.

The more advanced options like entanglement respond dynamically to each device in a unique way—a bad actor would have to get full control over both ends to see anything, but at that point, they already own everything to which you have access. If they've already full compromised your device, cryptography cannot help secure the communications. Remember, even a spoofed or compromised resonator is insufficient to break RC. However, like all security, this may slightly open the weakest algorithms to cryptanalysis, but that also requires the cyphertext be captured in large quantities. Strong algorithms can have dynamic variables dependent on time, GPS coordinates, IP address, etc. which vastly expand the resources need to reverse engineer the algorithm (assuming the bad actor had full access to all the resonator streams used and the cyphertext).

Figure 15:
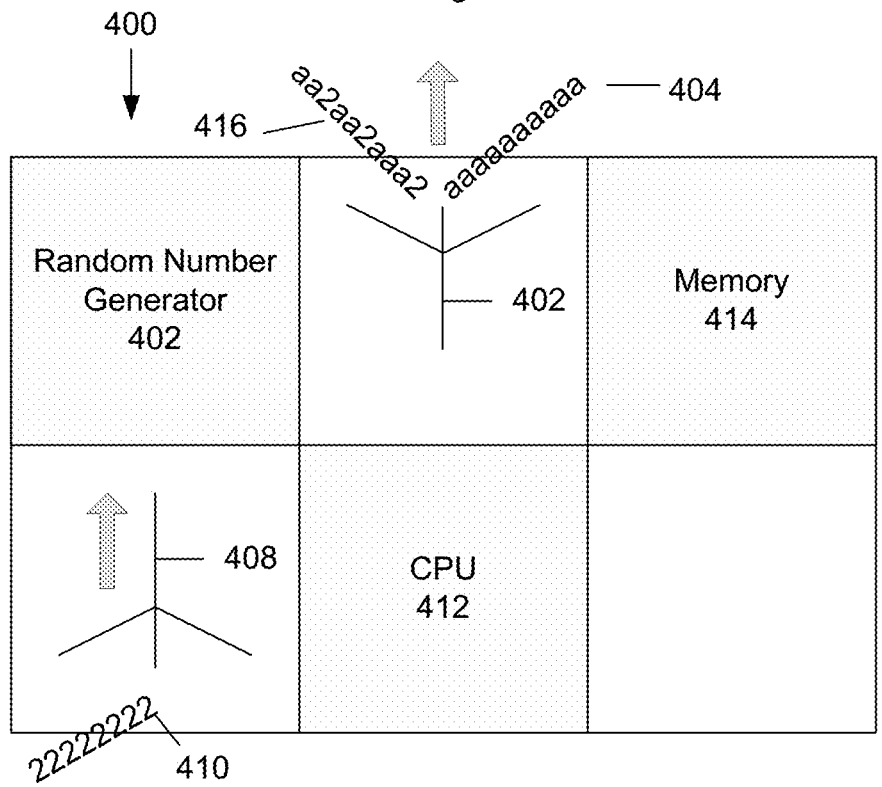
FIG. 15 illustrates an example of a resonator of the present invention.

FIG. 15 illustrates an example of the basic hardware configuration for a resonator 400. The resonator 400 can include a random number generator 402. The RNG 402 can include at least one of a true random number generator, pseudo-random number generator, or any non-repeating sequence of numbers having a characteristic of a random number stream. As above, the random number generator 402 can generate a first stream of random numbers 404. The resonator 400 can include a transmitter 406 which can be electrically coupled to the random number generator 402. The transmitter 406 transmits the first stream 404 of random numbers by at least radio frequency or through a network. The resonator 400 can also include a receiver 408 to receive streams of numbers 410 from other devices discussed below. One of ordinary skill in the art readily understands that the transmitter 406 and the receiver 408 can be in some examples one in the same element, a transceiver. This includes any processing required to either send or receive the streams 404, 410.

Also included can be a processor 412 integrating a second stream 410 of numbers into the first stream 404 of random numbers for form a combined stream and a non-transitory resonator memory 414 to store data. The second stream 410 of numbers can be received from a second resonator or other user device discussed below.

Figure 16:
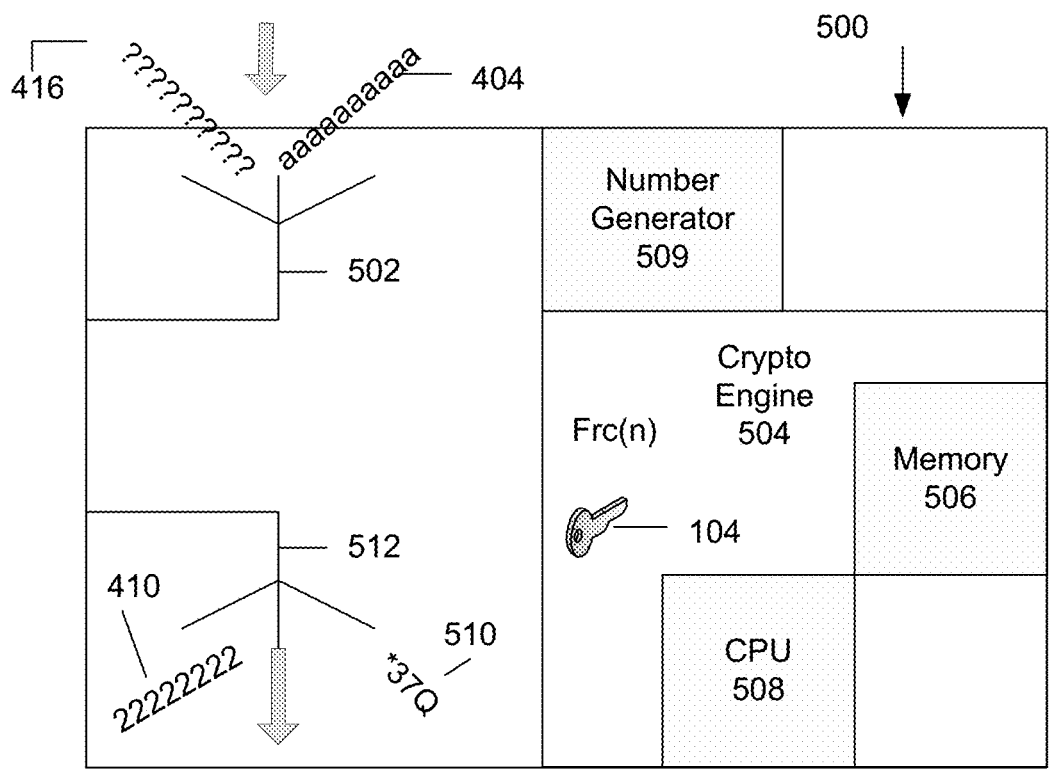
FIG. 16 illustrates an example of a communicator of the present invention.

FIG. 16 illustrates a communicator 500 which can be used to communicate with the resonator 400 and other user devices. Communications in the context of this invention include receiving random number streams from one or more resonators 400, transmitting communicator numbers to the resonator 400 and communicating with other communicators to exchange plain text and encrypted communications and the algorithm to generate an encryption key.

To facilitate these capabilities, the communicator has a communicator receiver 502 which can receive the first stream 404 as well as a communicator crypto engine 504 which can be electronically linked to the communication receiver 502. The crypto engine 504 can also include a non-transitory memory 506 and a processor 508 electronically linked to the memory. One example of the communicator crypto engine's 504 tasks can be to read at least a portion of the first stream 404 and to convert the portion of the first stream 404 into a cryptographic key 104.

In further examples, there can be a second or further communicators as part of the system, these additional communicators can have more or less capabilities that the communicator 500 described above. When the first communicator communicates with the second, for example when Alice communicates with Bob, as described in the many examples above, the first and second communicator processors 508 have a common algorithm to independently convert the portion of the first stream 404 into the cryptographic key 104. This is one of the advantages of the invention, neither Alice nor Bob have to share a key, they each generate their own independently. This key is also generated only at the time it is needed, so it is not stored, waiting to unlock data in the future. This increases security since the key does not need to be transmitted, it cannot be intercepted. Also, since it is generated on the fly for each data set, the possession of an old key does not permit the decryption of any future data, or past data other than the data the key was generated for.

To include some hardware into the examples above, as already noted, the communicator receiver 502 can receive a second stream of numbers 416 from a second resonator. The non-transitory memory 506 can store at least a portion of the second stream 416. The communicator processor 508 can then read the portion of the second stream 416 and uses both portions 404, 416 to create the cryptographic key 104.

Other examples have that the communicator 500 also includes a communicator number generator 509 that can generate a communicator number 510. The communicator number generator 509 can be a RNG as described above, to generate random or pseudo-random streams 410 to be inserted into a resonator's 400 stream. The communicator number generator 509 can also generate non-random streams that can be used to identify the communicator 500 or in coordination with the crypto engine 504, to insert messages, as described below.

The communicator 500 can also include a communicator transmitter 512 transmitting the communicator number 410, 510 to the resonator 400. The resonator receiver 408 receives the communicator number 410, 510; and resonator processor 412 can integrate the communicator number 410, 510 into the stream of random numbers 404 to form a combined stream 416 which can be transmitted by the transmitter 402.

In other examples noted above, once the communicator number 510 is inserted into a combined resonator stream 416 a second communicator 500 can receive the combined stream 416 and detect the communicator number 510. Once so informed the second communicator can generate its own (a second) communicator number. The first 510 and second communicator numbers can now be sent to the resonator 400 to be combined with the resonator stream 404 to make a second combined stream which can be transmitted by the transmitter 402.

Yet further examples of RC involved the timing of the streams. So, the resonator transmitter 402 can transmit a portion of the first stream at a time T0. This T0 first stream can be recorded, either by a second device (like a communicator 500) or the resonator 400 itself. Regardless of what device records it, the T0 first stream can be stored in the resonator memory 414 (i.e., it was already there if recorded by the resonator, or it can be received back through the receiver 408 when recorded elsewhere). The processor 412 can now combine the T0 first stream with a portion of the first stream at a time T1 to form a recursive stream 112 that is then transmitted.

Other examples using the timing of the streams include a data set 302 having at least a value V1. Here, the resonator 400 transmits a portion of the first stream at a time T0 and the communicator crypto engine 504 can encrypt value V1 using the T0 first stream. The resonator 400 can also transmit a portion of the first stream at a time T1. This can allow the communicator crypto engine 504 to decrypt value V1 using the T0 first stream and reencrypts value V1 using the T1 first stream. Amber crypto, as noted above, is another example of using a time segment of a stream. An amber non-transitory memory can store the T0 first stream and a data set can be encrypted using the T0 first stream.

More examples of using multiple resonators 400 and/or multiple communicators 500 can result in the recombinant stream 114 described above. Here, the second resonator transmits a second stream of numbers 416 and the communicator 500 can receive the first and the second streams 404, 416. The communicator crypto engine 504 can combine the first and the second streams 404, 416 to form the recombinant stream 114 which can be transmitted by the first communicator transmitter 512. The recombinant stream 114 can be typically formed when the first communicator crypto engine 504 applies an algorithm, in one example Frc(n) to the first and the second streams 404, 416 to form the recombinant stream 114.

Other examples can result in "ghost" communications. Here, the first communicator number 510 can be a clear text message transmitted to the resonator 400 using a first sequence to form the combined "ghost stream" 212 of the first stream 404 and the first sequence of the first communicator number 510. Then a second communicator can receive the ghost stream 212 and its crypto engine 504 applies the filter 214 filtering the first communicator number 510 from the ghost stream 212. Note that any number of resonators 400 and their streams can be used to divide the message between.

The geo-fencing examples can also be discussed. Herein, the resonator transmitter 402 is a short range transmitter and a transmitter signal range defines a geo-fence area 304. When the communicator receiver 502 receives the first stream of numbers 404 inside the geo-fence area the communicator crypto engine 504 can create the cryptographic key 104 needed to access whatever data sets or hardware are part of the geo-fence area 304. Conversely, when the communicator 500 is outside the geo-fence area 304, e.g., can no longer receive the transmitter signal, the communicator crypto engine 504 cannot create the cryptographic key 104. This can be easily noted, since if a user cannot access the proper resonator, it will never have all of the information needed to read the encrypted information.

The following examples describe the methods of using RC in steps. Note that these steps can be performed by the hardware discussed herein and can be embodied in either specially designed hardware or in software running on typical or proprietary hardware.

Figure 17:
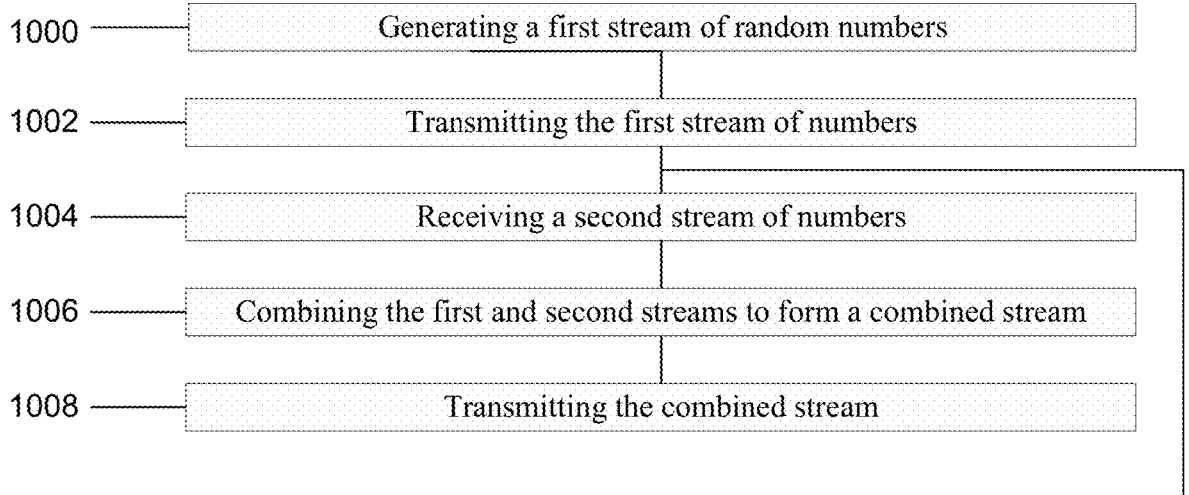
FIG. 17 is a flow chart illustrating an example of a resonator method of the present invention.

FIG. 17 illustrates an example of a method to encrypt and decrypt data using resonant cryptography, these are the basic steps of the resonator 100, including generating a first stream of random numbers using the resonator 400 (step 1000) and then transmitting the first stream of numbers using a transmitter 402 (step 1002). The figure further includes the method of basic entanglement, which can include the steps of receiving, at the resonator 400, the second stream of numbers 410 (step 1004). The first stream and the second stream 404, 410 can be combined, using a processor 412 at the resonator 400, to form a combined stream 208 (step 1006) and then transmitting the combined stream 208 with the transmitter 402 (step 1008).

Figure 18:
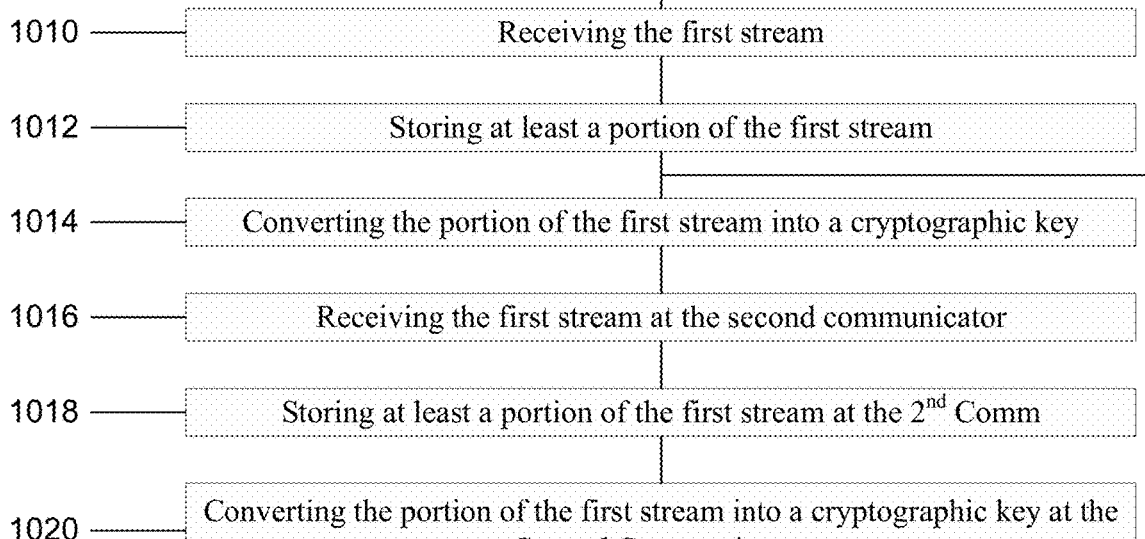
FIG. 18 is a flow chart illustrating an example of a communicator method of the present invention.

FIG. 18 illustrates some of the examples involving the communicator 500. Here the method includes receiving the first stream 402 at a communicator 500 (step 1010) and then storing at least a portion of the first stream 402 in the memory 506 of the communicator (step 1012). The processor 508 of the communicator can convert the portion of the first stream 402 into a cryptographic key 104 (step 1014). This can be done using an algorithm.

Adding at least one more communicator 500 allows two parties to securely communicate. This method has the second communicator receiving the first stream 402 (step 1016) and storing a portion of it (step 1018). The second communicator 500 can then convert the portion of the first stream into the same cryptographic key 104 using the same algorithm (step 1020). As above, this allows Alice and Bob to communicate using the same key, but generated independently and in some examples, on-the-fly.

Figure 19:
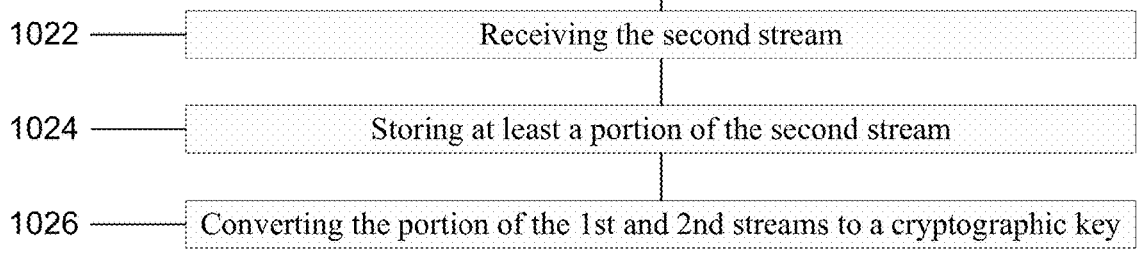
FIG. 19 is a flow chart illustrating an example of a convergence method of the present invention.

An example of the use of multiple resonators is illustrated in FIG. 19. The communicator 500 can receive the second stream of numbers 416 generated by a second resonator 400 (step 1022) and store at least a portion thereof (step 1024). The portions of the first and the second streams 402, 416 can be converted into a cryptographic key using an algorithm (step 1026).

Figure 20:
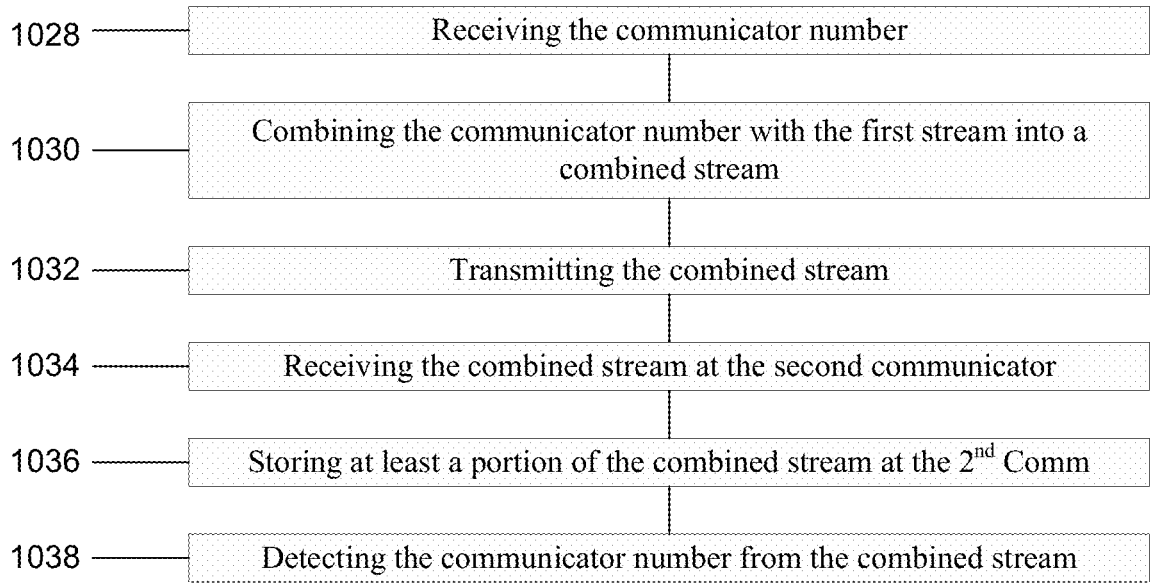
FIG. 20 is a flow chart illustrating an example of a signaling method of the present invention.

Combining resonator 400 and communicator 500 streams is an example of a method of convergence, as illustrated in FIG. 20. This example has the resonator 400 receiving the communicator number 410, 510 generated by the first communicator (step 1028). This step is taken from the resonator's point of view, but in other examples can easily be that the communicator 500 generated the communicator number 410, 510 and transmitted it to the resonator 400. However, it can be the resonator 400 that combines the communicator number 410, 510 with the first stream 402 into a combined stream 416 (step 1030) and then transmits it (step 1032).

Continuing with the above example, this combined stream allows Alice to signal (or more) to Bob secretly. This method includes receiving, at a second communicator, the combined stream 416 (step 1034) and then storing at least a portion of it (step 1036). The processor of the second communicator 508 can detect the portion of the communicator number 410, 510 from the combined stream 416 (step 1038).

Figure 21:
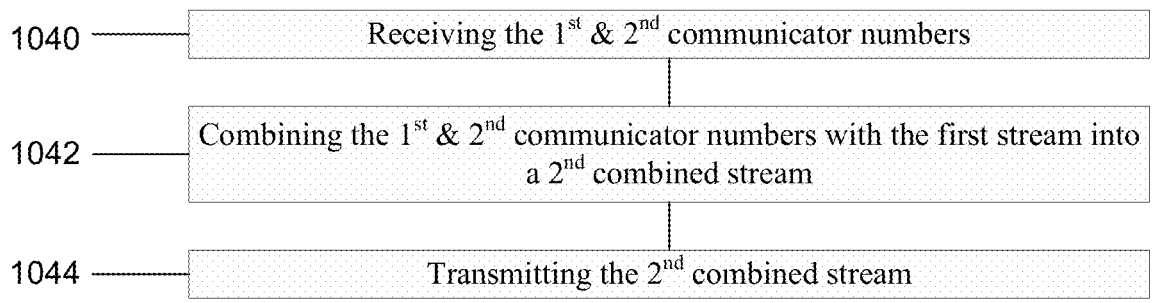
FIG. 21 is a flow chart illustrating an example of a combined stream method of the present invention.

FIG. 21 illustrates an example of a method of cascading. In this method, the resonator 400 receives (or receives back) a second communicator number generated by the second communicator and the first communicator number, both transmitted by the second communicator (step 1040). The resonator 400 combines the first and the second communicator numbers with the first stream into a second combined stream (step 1042) and then transmits it (step 1044).

Figure 22:
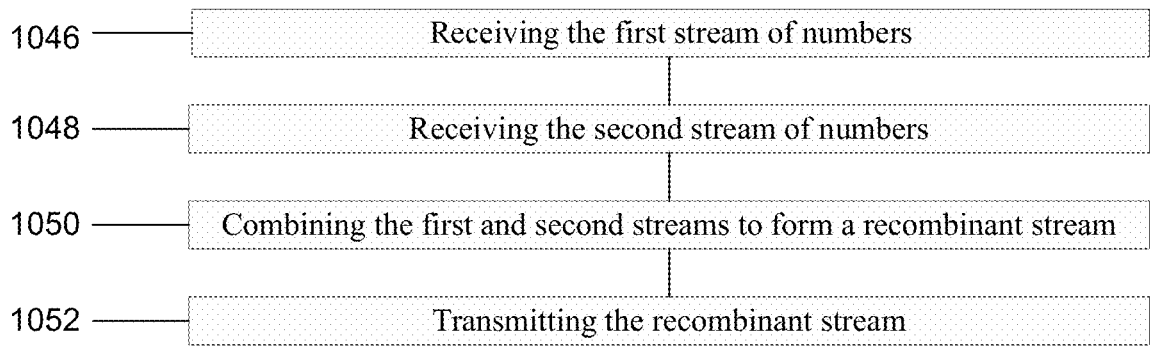
FIG. 22 is a flow chart illustrating an example of a recombinant stream method of the present invention.

Further, FIG. 22 illustrates a method of forming the recombinant stream 114. The first communicator 500 now receives the first stream 402 (step 1046) and the second stream 410 of numbers (typically generated by a second resonator) (step 1048). The two streams are altered and/or combined using some form of algorithm to thus convert a portion of the first and the second streams into the recombinant stream 114. (step 1050). The recombinant stream 114 is transmitted with a first communicator transmitter 512 (step 1052).

Figure 23:
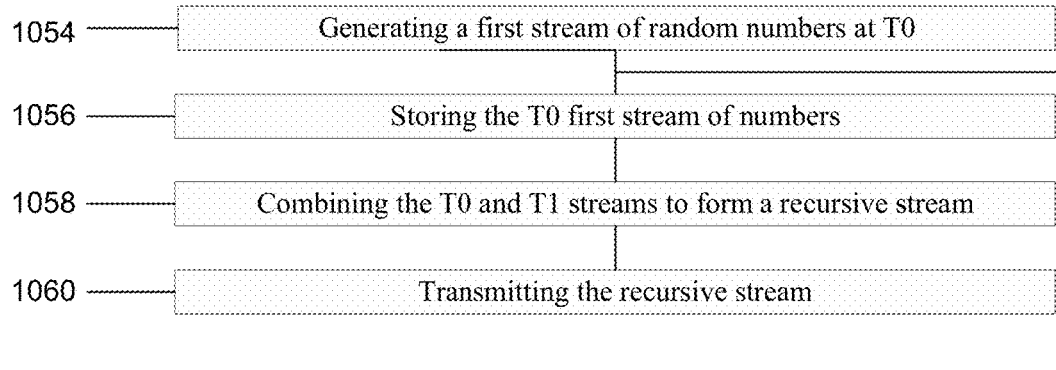
FIG. 23 is a flow chart illustrating an example of a recursive stream method of the present invention.
Figure 24:
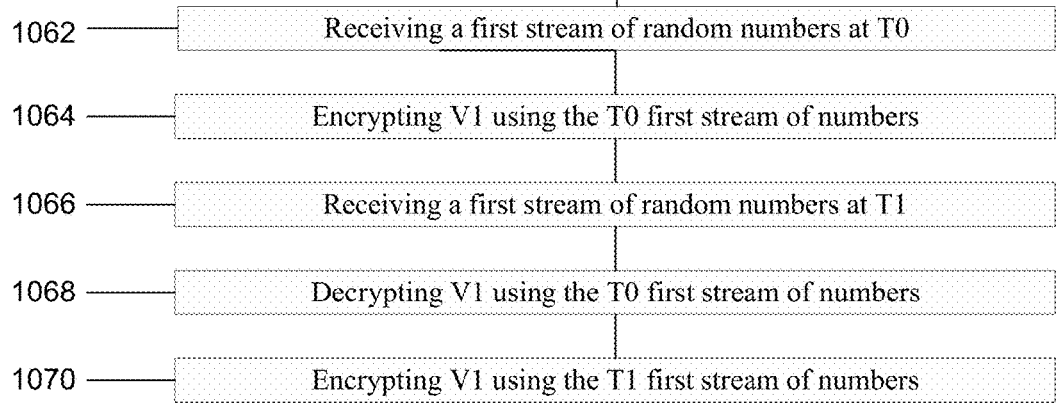
FIG. 24 is a flow chart illustrating an example of a public data encryption method of the present invention.
Figure 25:
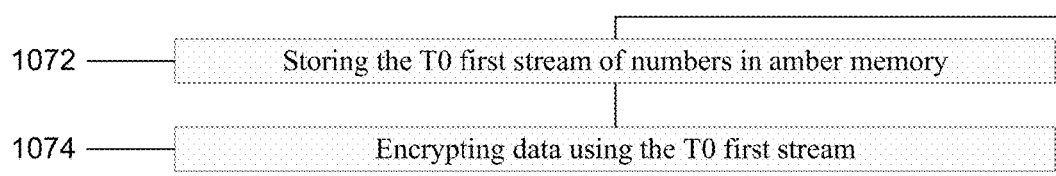
FIG. 25 is a flow chart illustrating an example of an amber storage method of the present invention.

FIGS. 23-25 illustrate examples where segments of the stream are taken at different times to get more advanced cryptographic results. For a recursive stream 112, an example of a method includes generating a first stream of random numbers at a time T0 using the resonator (step 1054). A portion of the T0 first stream is stored in a non-transitory memory (step 1056). This storage can be on the same resonator 400 that generated the T0 first stream, a different resonator, or a communicator 500. Regardless of where its stored, the T0 first stream is then sent back to the resonator to be combined with a portion of the first stream at a time T1 to form a recursive stream (step 1058) which is then transmitted (step 1060). See FIG. 23.

Another time segment method, illustrated in FIG. 24, allows separate values publicly available to be encrypted over time. In this method the communicator 500 receives the T0 first stream (step 1062) and encrypts a first data value V1 using the T0 first stream (step 1064). Separated in time, now the communicator 500 receives a T1 first stream from the resonator (step 1066). The data value V1 can then be decrypted using the T0 first stream (step 1068) and then encrypted using the T1 first stream (step 1070).

A yet further time example is amber crypto. Here an example of a method includes generating a first stream of random numbers at a time T0 using the resonator (step 1054) (as above). The T0 first stream is stored in an amber memory (step 1072) and used to encrypt a data set (step 1074). However, once encrypted in this fashion, there is no way for a bad actor to listen in for the T0 stream, it is lost to time.

Figure 26:
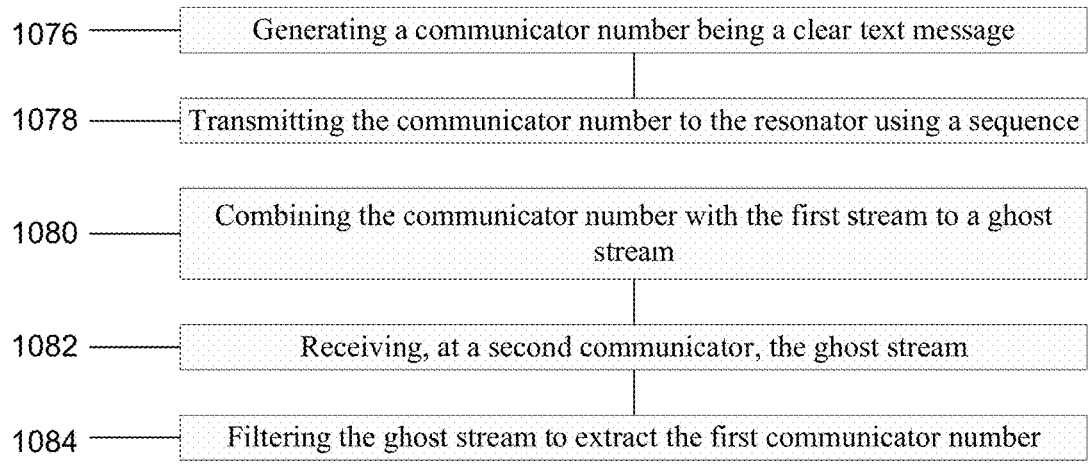
FIG. 26 is a flow chart illustrating an example of a ghost communication method of the present invention.

Ghost RC can be another powerful tool. It can be used to send clear text in public streams, Bob just needs to know which streams and which segments are ghost segments from the public segment of the streams. It can also send an encrypted message to add to its obscuration. FIG. 26 illustrates an example of this method by generating at the first communicator, a first communicator number 510 which is a clear text message (step 1076). The first communicator number can be transmitted to the resonator 400 using a first sequence (step 1078). The first communicator number is combined with the first stream into a ghost stream at the resonator 400 (step 1080). The second communicator receives the ghost stream 116 (step 1082) and filters it to extract the first communicator number from the ghost stream 116 (step 1084).

Figure 27:
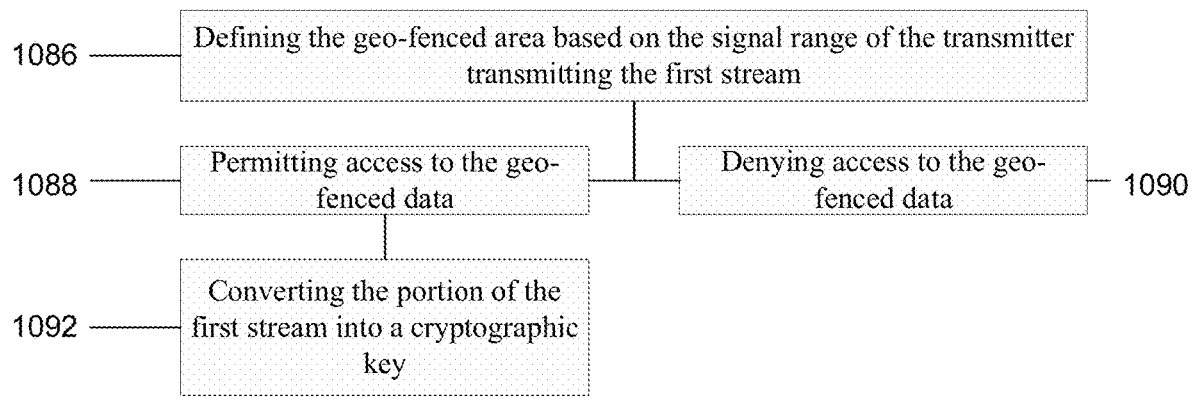
FIG. 27 is a flow chart illustrating an example of a geo-fencing method of the present invention.

Another example can lead to a method of geo-fencing an area to restrict data access. One example, illustrated in FIG. 27, defines the geo-fenced area 304 based on the signal range of the transmitter transmitting the first stream (step 1086). Once defined, access to the geo-fencer data can be permitted (step 1088) or denied (step 1090) based on receiving the first stream at the first communicator. If the first stream is received, the cryptographic key used to decrypt the data in the geo-fenced area can be created (step 1092).

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Any or all of the above transmitters or receivers can act in concert as a transceiver and may be compatible with one or more of radio-frequency identification (RFID), near-field communication (NFC), Bluetooth®, low-energy Bluetooth® (BLE), LiFi, WiFi™, ZigBee®, ambient backscatter communications (ABC) protocols or similar technologies. The resonators and/or communicators may include hardware, firmware, and/or software that allows their processor(s) to communicate with other devices via wired or wireless networks, whether local or wide area, private or public, as understood by those of ordinary skill in the art. Received information (streams, algorithms, etc.) may be processed by one or more computer processors as desired in various implementations of the disclosed technology and/or stored in one or more memory devices.

A processor may include one or more of a microprocessor, microcontroller, digital signal processor, co-processor or the like or combinations thereof capable of executing stored instructions and operating upon stored data. The memories may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like). The memory may store files including an operating system, application programs (including, for example, a web browser application, a widget or gadget engine, and or other applications, as necessary), executable instructions and data.

Given the above concepts, the hardware and software running RC can be varied across the whole spectrum of IoT devices. These include servers standing alone (e.g. air gapped) or networked to one or more communicators. The network 300 may include one or more packet switched networks, such as an Internet protocol (IP) based network, a local area network (LAN), a wide area network (WAN), a personal area network (PAN), an intranet, the Internet, a cellular network (e.g., GSM (Global System for Mobile Communications), CDMA (Code-Division Multiple Access), WCDMA (Wideband CDMA), LTE (Long Term Evolution), IEEE 802.11x, etc.), a fiber-optic network, or another type of network that is capable of transmitting data. The network 300 may include a circuit-switched network, such as a public-switched telephone network (PSTN) for providing telephone services for traditional telephones.

The resonator and/or the communicator can include one or more devices that communicate with the network 300 or each other. For example, the resonator and/or the communicator may include a television that includes applications (e.g., Internet Explorer®, Chrome®, etc.) and a communication interface (e.g., a wired or a wireless communication interface) to connect to the network. The resonator and/or the communicator can also include one or more devices that communicate with network to provide Internet service. For example, these may include a desktop computer, a laptop computer, a palmtop computer, a netbook, tablet, smartphone, etc. or other types of communication devices. The servers can host a webpage that can be accessed by a user using the communicators.

Since many devices described above already have a pseudo random number generator built in, a chip or software integrating RC, to form a resonator 100, can have a new property: the ability to receive multiple different external resonator streams and combine them using a programmable set of formulas. It must also have the ability to combine this output with the equivalent to plaintext (unencrypted data) as a stream of encrypted data, also using anything from modular addition to more complex schemes and reverse the process for decryption. It may be a standalone chip or part of an SOC. The chip would have all or some subset of the above RC crypto properties and possibly integrate a reduced instruction set of mathematical functions, ideally using low energy.

A more advanced feature would allow the resonator input/output streams to be both analog and digital. Any hardware can harmonize the different forms of resonator streams and the required functions to use them. For example, a device accepting resonator streams from a phase shifting RC encryption scheme could combine with an IP-based stream to create a new broadcast analog transmission. The hardware can be designed to serve a mixing input/output chamber for all forms of resonators and their accompanying technologies to create new resonator streams themselves.

Hybrid network configurations using RC can use programmable RC circuits on both transmitters and receivers as an effective crypto channel for securing communications. The simplest example would be a digital encrypted radio network where a private secure mesh could be dynamically created to establish a closed and encrypted communications hub. The complexity of building secure end-user devices and switching infrastructure is greatly reduced along with the mobile device power requirements to participate in this type of hybrid network. By analogy, any hybrid solution can be created to take advantage of the RC efficiency, especially when the RC platform is integrated as a programmable hardware solution seamlessly transitioning between operating environments.

The descriptions contained herein are examples of embodiments of the invention and are not intended in any way to limit the scope of the invention. As described herein, the invention contemplates many variations and modifications of a resonant cryptography system. Also, there are many possible variations in the design and configurations of the resonators. These modifications would be apparent to those having ordinary skill in the art to which this invention relates and are intended to be within the scope of the claims which follow. For example, one skilled in the art will recognize that executable instructions may be stored on a non-transient, computer-readable storage medium, such that when executed by one or more processors, causes the one or more processors to implement the methods described above.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one example," "an example," "further example," "various examples," "some examples," etc., indicate that the example(s) of the disclosed technology so described may include a particular feature, structure, or characteristic, but not every example necessarily includes the particular feature, structure, or characteristic. Further, repeated use of the phrase "in one example" does not necessarily refer to the same example, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Further, throughout the streams are noted as being random numbers or generated from RNGs. However, in this context, and as illustrated, the stream may not be just number sequences, it can be any character, letter or digit, in any appropriate language or alphabet, from Arabic, to binary, to Cyrillic, to Greek.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

While certain implementations of this disclosure have been described in connection with what is presently considered to be the most practical and various implementations, it is to be understood that this disclosure is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the technology and also to enable any person skilled in the art to practice certain implementations of this technology, including making and using any apparatuses or systems and performing any incorporated methods. The patentable scope of certain implementations of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of decrypting data comprising:
receiving, by a first communicator, a transmitted geo-fence stream;
storing, in a non-transitory memory of the first communicator, at least a portion of the geo-fence stream;
converting, using a processor of the first communicator, the portion of the geo-fence stream into a cryptographic key using an algorithm; and
decrypting, by the first communicator, at least a portion of data stored inside a geo-fenced area using the cryptographic key,
the geo-fence stream is a stream of random numbers generated by a resonator and transmitted by a geo-fence transmitter,
the geo-fenced area is defined by a signal range of the geo-fence transmitter, and
data stored inside the geo-fence area is configured to be inaccessible to devices not receiving the geo-fence stream.

2. The method of claim 1, further comprising the steps of:
receiving, by the first communicator, a transmitted first combined stream;
the first combined stream comprising the geo-fence stream with a second stream to form the first combined stream; and
the first combined stream is a new geo-fence stream.

3. The method of claim 1, further comprising the steps of:
receiving, by the first communicator, a second stream of numbers; and
storing, in the non-transitory memory of the first communicator, at least a portion of the second stream;
the converting step uses the portion of the geo-fence stream and the second streams as a new geo-fence stream.

4. A method of encrypting data comprising:
receiving, by a first communicator, a transmitted geo-fence stream;
storing, in a non-transitory memory of the first communicator, at least a portion of the geo-fence stream;
converting, using a processor of the first communicator, the portion of the geo-fence stream into a cryptographic key using an algorithm; and
encrypting, by the first communicator, at least a portion of data stored inside a geo-fenced area using the cryptographic key,
wherein the geo-fence stream is a stream of random numbers generated by a resonator and transmitted by a geo-fence transmitter, and wherein the geo-fenced area is defined by a signal range of the geo-fence transmitter, and wherein data stored inside the geo-fence area is configured to be inaccessible to devices not receiving the geo-fence stream.

5. The method of claim 4, further comprising the steps of:
receiving, by the first communicator, a transmitted first combined stream;
the first combined stream comprising the geo-fence stream with a second stream to form the first combined stream; and
the first combined stream is a new geo-fence stream.

6. The method of claim 4, further comprising the steps of:
receiving, by the first communicator, a second stream of numbers; and
storing, in the non-transitory memory of the first communicator, at least a portion of the second stream;
the converting step uses the portion of the geo-fence stream and the portion of the second stream as a new geo-fence stream.

7. A system for secure communications using resonant cryptography, comprising:
a resonator, comprising:
a random number generator comprising at least one of a true random number generator, pseudo-random number generator, and any non-repeating sequence of numbers having a characteristic of a random number stream, and generating a first stream of random numbers; and
a transmitter, electrically coupled to the random number generator, transmitting the generated first stream of random numbers as a geo-fence stream;
the transmitter transmitting the geo-fence stream to a first communicator;
the transmitter is a short-range transmitter and a transmitter signal range defines a geo-fence area;
when the first communicator receives the geo-fence stream inside the geo-fence area, the first communicator is granted access to data inside the geo-fenced area;
when the first communicator is outside the geo-fence area the first communicator at least one of, cannot, receive the geo-fence stream and is denied access the data inside the geo-fenced area; and
access to the data inside the geo-fenced area is granted or denied based a cryptographic keys based on at least a portion of the geo-fenced stream.

8. The system of claim 7, the resonator further comprises:
a receiver receiving a second stream of random numbers; and
a processor integrating the second stream of random numbers into the first stream of random numbers for form the geo-fence stream;
the transmitter transmits the geo-fence stream.

9. The system of claim 8, the second stream of numbers is received from a second resonator.

10. A system for secure communications using resonant cryptography, comprising:
a first communicator comprising:
a first communicator receiver receiving a geo-fence stream;
a first communicator crypto engine, electronically linked to the first communication receiver, and comprising:
a non-transitory memory storing at least a portion of the geo-fence stream; and
a first communicator processor electronically linked to the memory to read at least a portion of the geo-fence stream and to convert the portion of the geo-fence stream into a cryptographic key,
the ability of the first communicator receiver to receive the geo-fence stream defines a geo-fence area;
when the first communicator receiver receives the geo-fence stream of numbers inside the geo-fence area the first communicator crypto engine can create the cryptographic key; and when the first communicator receiver is outside the geo-fence area the first communicator crypto engine cannot create the cryptographic key if the first communicator cannot receive the geo-fence stream.

11. The system of claim 10, the first communicator receiver receiving a second geo-fence stream comprising a second stream of random numbers combined with the geo-fence stream of random numbers, and the second geo-fence stream is a new geo-fence stream.

12. The system of claim 10, the first communicator receiver receives a second stream of numbers;

the non-transitory memory stores at least a portion of the second stream; and the first communicator processor reads at least a portion of the second stream and uses both portions of the geo-fence stream and the second stream as a new geo-fence stream.

13. A communicator for secure communications comprising:

a first receiver configured to receive a first stream of random numbers; and a first crypto engine comprising:

a non-transitory memory; and a first processor;

the first crypto engine is electronically linked to the first receiver, and the first processor is electronically linked to the non-transitory memory;

the first stream of random numbers is generated by at least one of a true random number generator, a pseudo-random number generator, and a non-repeating sequence of numbers having a characteristic of a random number stream;

the first processor is configured to read at least a first portion and a second portion of the first stream of random numbers and to convert the first portion and the second portion of the first stream of random numbers into a first cryptographic key and a second cryptographic key respectively;

the first portion of the first stream of random numbers is transmitted at time T0, and the second portion of the first stream of random numbers is transmitted at time T1, and T0 and T1 are separated in time; and the communicator is configured to encrypt and decrypt a data value V1 using the first cryptographic key, and to reencrypt the data value V1 using the second cryptographic key.

14. The communicator of claim 13, the first receiver configured to receive a first combined stream of random numbers;

the first combined stream comprising a combination of the first stream with the second stream; and the first combined stream is a new first stream.

15. The communicator of claim 13, the first receiver receives the first stream of random numbers by at least one of radio frequency and through a network.

16. The communicator of claim 13, an access to receive the first stream of random numbers is restricted.

17. The communicator of claim 13, further comprising:

a first communicator number generator generating a first communicator number;

the first receiver configured to receive a first combined stream comprising the first communicator number combined into the first stream of random numbers; and the combined stream is a new first stream.

18. The communicator of claim 17, the first receiver configured to receive a second combined stream comprising the first communicator number combined into a second communicator number and the first stream of random numbers; and the second combined stream is a new first stream.

19. The communicator of claim 13, the first receiver configured to receive a recursive stream;

the recursive stream comprising a combination of the T0 first stream with the T1 first stream at the time T1.

20. The communicator of claim 13, further comprising:

an amber non-transitory memory storing the T0 first stream; and a data set encrypted using the T0 first stream.

21. A method to encrypt and decrypt data using resonant cryptography, comprising the steps of:

receiving, at a first communicator, a first stream of random numbers;

storing, in a non-transitory memory of the first communicator, at least a first portion of the first stream;

converting, using a processor of the first communicator, the first portion of the first stream into a cryptographic key using an algorithm;

receiving, at the first communicator, the first stream of random numbers at a time T0;

encrypting, using the processor, a first data value using the first portion of the first stream at the time T0 as a T0 first stream;

receiving, at the first communicator, a second stream of random numbers at a time T1;

decrypting, using the processor, the first data value using the T0 first stream; and encrypting, using the processor, the first data value using the portion of the second stream at the time T1 as a T1 first stream, T0 and T1 are separated in time.

22. The method of claim 21, further comprising the steps of:

receiving, at the first communicator, a first combined stream of random numbers;

the first combined stream comprising a combination of the first stream with the second stream; and the first combined stream is a new first stream.

23. The method of claim 21, further comprising the steps of:

transmitting, from the first communicator a number generated by the first communicator; and receiving, at the first communicator, a second combined stream of random numbers;

the second combined stream comprising a combination of the first communicator number with the first stream into a second combined stream; and the second combined stream is an alternate first stream.

24. The method of claim 21, further comprising the steps of:

receiving, at the first communicator, a third combined stream of random numbers;

the third combined stream comprising a combination of the first communicator number, a second communicator number and the first stream; and the third combined stream is a new first stream.

25. The method of claim 21, further comprising the steps of:

receiving, at the first communicator, a recursive stream;

the recursive stream comprises a combination of the T0 first stream with the T1 first stream at the time T1.

26. The method of claim 21, further comprising the steps of:
  storing the T0 first stream in an amber non-transitory memory; and
  encrypting a data set using the T0 first stream.

\* \* \* \* \*